US009887440B2

(12) United States Patent
Kubota et al.

(10) Patent No.: US 9,887,440 B2
(45) Date of Patent: Feb. 6, 2018

(54) ELECTRICITY STORAGE BLOCK AND ELECTRICITY STORAGE MODULE

(71) Applicant: HITACHI AUTOMOTIVE SYSTEMS, LTD., Hitachinaka-shi, Ibaraki (JP)

(72) Inventors: Osamu Kubota, Tokyo (JP); Akira Sato, Tokyo (JP); Kazunori Ojima, Hitachinaka (JP); Sadayuki Aoki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 49 days.

(21) Appl. No.: 14/895,665

(22) PCT Filed: May 28, 2014

(86) PCT No.: PCT/JP2014/064048
§ 371 (c)(1),
(2) Date: Dec. 3, 2015

(87) PCT Pub. No.: WO2014/196422
PCT Pub. Date: Dec. 11, 2014

(65) Prior Publication Data

US 2016/0141737 A1 May 19, 2016

(30) Foreign Application Priority Data

Jun. 6, 2013 (JP) ................................ 2013-119729

(51) Int. Cl.
*H01M 2/10* (2006.01)
*H01M 10/50* (2006.01)
(Continued)

(52) U.S. Cl.
CPC ..... *H01M 10/6556* (2015.04); *H01M 2/1077* (2013.01); *H01M 10/0481* (2013.01);
(Continued)

(58) Field of Classification Search
CPC ...... H01M 2/10; H01M 6/5038; H01M 10/60; H01M 10/613; H01M 10/617; H01M 10/655
See application file for complete search history.

(56) References Cited

U.S. PATENT DOCUMENTS

2011/0200862 A1 8/2011 Kurosawa
2012/0247107 A1* 10/2012 Balk .................. H01M 2/0217 60/718
(Continued)

FOREIGN PATENT DOCUMENTS

JP 2009-170258 A 7/2009
JP 2011-034775 A 2/2011
(Continued)

OTHER PUBLICATIONS

The Extended European Search Report dated Jan. 5, 2017 in the EP Application No. 14807786.0.

*Primary Examiner* — Ula C Ruddock
*Assistant Examiner* — Julian Anthony
(74) *Attorney, Agent, or Firm* — Volpe and Koenig, P.C.

(57) ABSTRACT

An electricity storage block includes: an element stacked body in which a plurality of square electricity storage elements is stacked and arranged such that wide surfaces of the adjacent square electricity storage elements are opposed to each other; and a pressing device that presses the element stacked body toward the thermally-conductive sheet arranged on the heat transfer plate. The element stacked body includes holders having wide surface abutment parts in abutment with one of the wide surfaces in a pair in at least the predetermined square electricity storage element. The outer surfaces of the bottom plates of the square electricity storage elements are set as heat transfer surfaces thermally connected to the heat transfer plate via the thermally-conductive sheet. The heat-transfer surfaces protrude toward
(Continued)

the heat transfer plate more than the end surfaces of the wide surface abutment parts at the heat transfer plate side.

7 Claims, 25 Drawing Sheets

(51) Int. Cl.

| | |
|---|---|
| ***H01M 10/6556*** | (2014.01) |
| ***H01M 10/647*** | (2014.01) |
| ***H01M 10/6555*** | (2014.01) |
| ***H01M 10/613*** | (2014.01) |
| ***H01M 10/04*** | (2006.01) |
| *H01M 10/625* | (2014.01) |

(52) U.S. Cl.
CPC ..... *H01M 10/0486* (2013.01); *H01M 10/613* (2015.04); *H01M 10/647* (2015.04); *H01M 10/6555* (2015.04); *H01M 10/625* (2015.04); *H01M 2220/20* (2013.01)

(56) References Cited

U.S. PATENT DOCUMENTS

| | | | |
|---|---|---|---|
| 2012/0301769 | A1 | 11/2012 | Okada et al. |
| 2013/0337310 | A1 | 12/2013 | Omura et al. |

FOREIGN PATENT DOCUMENTS

| | | | |
|---|---|---|---|
| JP | 2011-171029 | A | 9/2011 |
| JP | 2012-248339 | A | 12/2012 |
| SG | 187634 | A1 | 3/2013 |
| WO | 2012/013789 | A1 | 2/2012 |
| WO | 20121117681 | A1 | 9/2012 |

* cited by examiner

ELECTRICITY STORAGE BLOCK AND ELECTRICITY STORAGE MODULE

TECHNICAL FIELD

The present invention relates to an electricity storage block with a plurality of electricity storage elements electrically connected together and an electricity storage module in which the electricity storage block is thermally connected to a heat transfer plate via a thermally-conductive sheet.

BACKGROUND ART

Electricity storage modules installed in hybrid electric automobiles and purely electric automobiles include a large number of electricity storage elements such as lithium-ion batteries and nickel-hydrogen batteries. The electricity storage elements generate heat due to internal resistance at the time of charging and discharging, and suffer more likely lifetime-related performance degradation such as a capacity reduction.

The electricity storage elements desirably have as smaller temperature rises as possible from the viewpoint of lifetime. To cool down the electricity elements, there is a method by which the electricity storage elements are thermally connected to a heat transfer plate via an elastic thermally-conductive sheet (refer to PTL 1). In the case of using such a thermally-conductive sheet, the electricity storage elements are pressed against the thermally-conductive sheet on the heat transfer plate to attach the electricity storage elements closely to the thermally-conductive sheet.

CITATION LIST

Patent Literature

PTL 1: JP 2011-34775 A

SUMMARY OF INVENTION

Technical Problem

To attach the heat transfer surfaces of the electricity storage elements closely to the thermally-conductive sheet, it is necessary to press the electricity storage elements toward the thermally-conductive sheet to compress the thermally-conductive sheet. However, this operation has a problem that a large compression reaction force acts on the electricity storage block at the time of compression of the thermally-conductive sheet.

Solution Problem

An electricity storage block according to Claim 1 is thermally connected to a heat transfer plate via an elastic thermally-conductive sheet, the electricity storage block including: an element stacked body in which a plurality of square electricity storage elements having a pair of first narrow surfaces, a pair of second narrow surfaces, and a pair of wide surfaces is stacked and arranged such that the wide surfaces of the adjacent square electricity storage elements are opposed to each other; and a pressing device that presses the element stacked body toward the thermally-conductive sheet arranged on the heat transfer plate, and the element stacked body includes a holder having a wide surface abutment part in abutment with one of the wide surfaces in a pair in at least the predetermined square electricity storage element, one of the first narrow surfaces in a pair in the square electricity storage element is set as a heat transfer surface thermally connected to the heat transfer plate via the thermally-conductive sheet, and the heat-transfer surface of the square electricity storage element protrudes toward the heat transfer plate more than the end surface of the wide surface abutment part.

An electricity storage module according to claim 7 includes: the electricity storage block according to claim 1 or 2; a heat transfer plate thermally connected to the electricity storage block; and a thermally-conductive sheet that is arranged on the heat transfer plate and is sandwiched between the electricity storage block and the heat transfer plate, and an end surface of the wide surface abutment part at the heat transfer plate side is opposed to the thermally-conductive sheet.

Advantageous Effects of Invention

According to the present invention, it is possible to reduce a compression reaction force from the thermally-conductive sheet on the element stacked body.

BRIEF DESCRIPTION OF DRAWINGS

FIG. 23 FIG. 14 is an exploded perspective view illustrating a configuration of an element stacked body of an electricity storage module according to a modification example of the third embodiment of the present invention.

DESCRIPTION OF EMBODIMENTS

Figure 1:
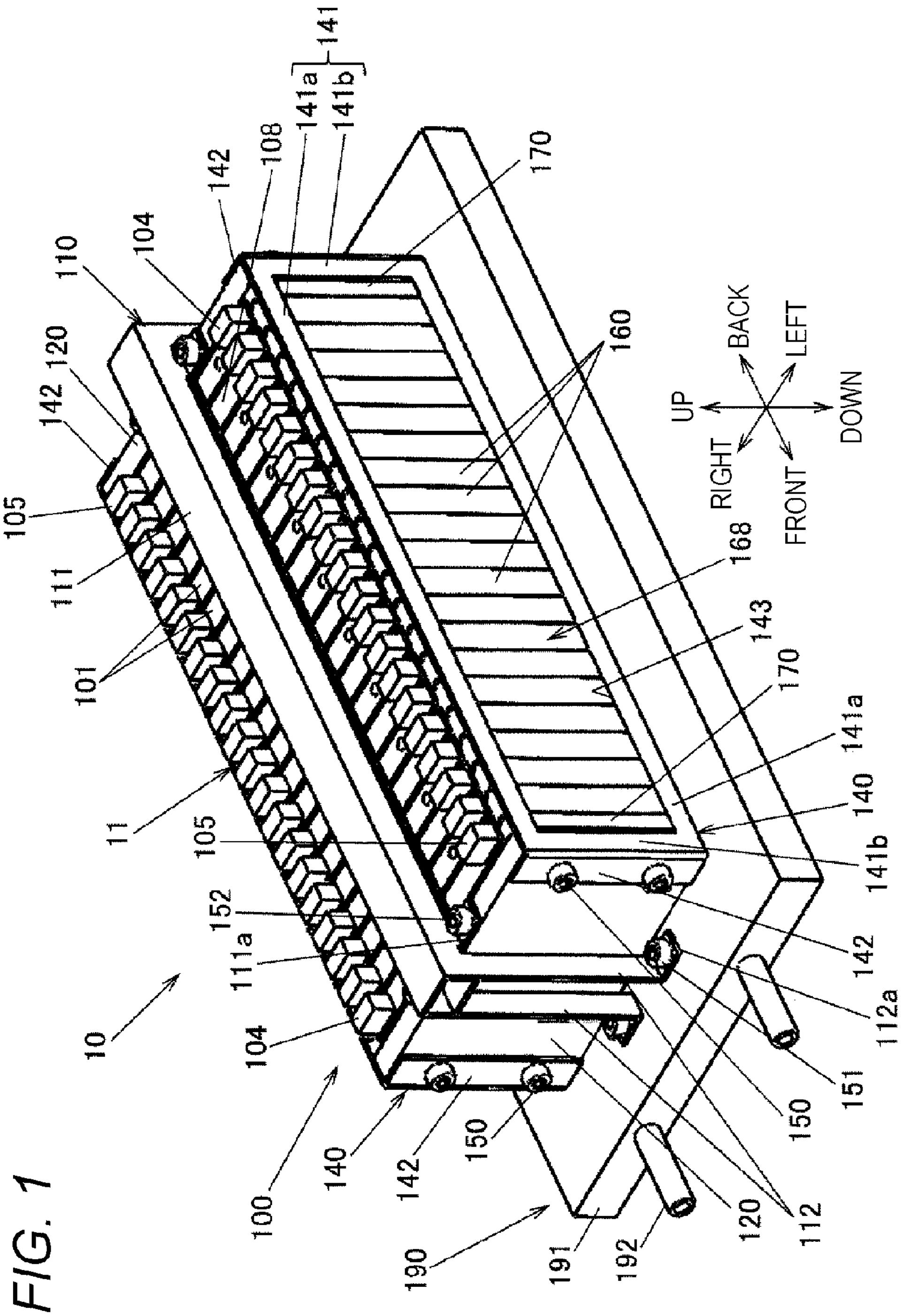
FIG. 1 is a perspective outer view of an electricity storage module according to a first embodiment of the present invention.

Embodiments in which the present invention is applied to an electricity storage module that is incorporated into an electricity storage device installed in a hybrid electric automobile or a purely electric automobile and includes a plurality of square lithium-ion secondary batteries (hereinafter, referred to as cell batteries) as electricity storage elements will be hereinafter described with reference to the drawings. For the convenience of description, the up-down direction, the front-back direction, and the right-left direction relative to the electricity storage module are defined as illustrated in the drawings. The up-down direction, the right-left direction, and the front-back direction shown by arrows are orthogonal to one another.

—First Embodiment—

Figure 2:
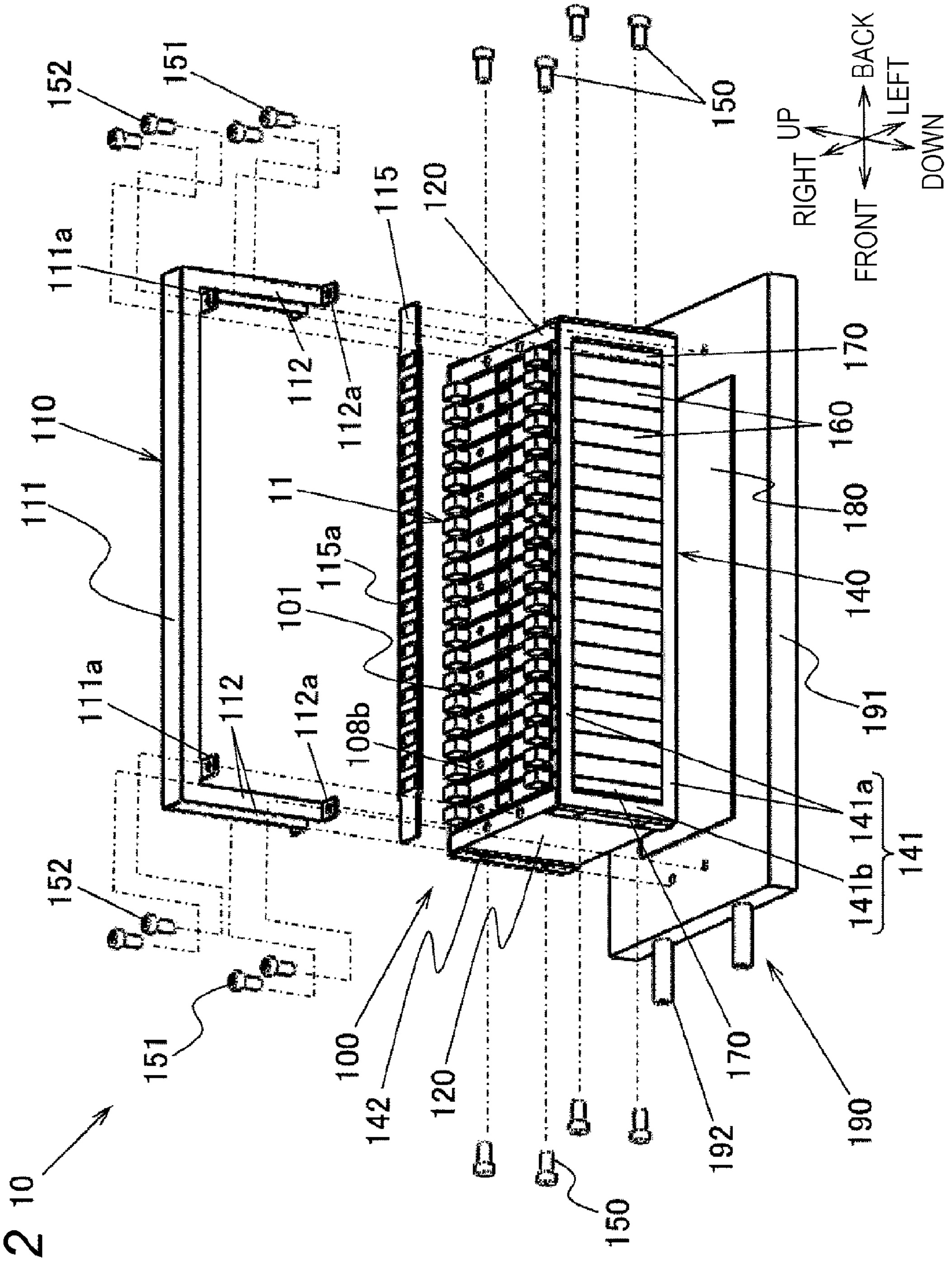
FIG. 2 is an exploded perspective view illustrating a configuration of the electricity storage module.

FIG. 1 is a perspective outer view of an electricity storage module 10 according to a first embodiment of the present invention. FIG. 2 is an exploded perspective view illustrating a configuration of the electricity storage module 10. The electricity storage module 10 is composed of a cooling structure 190 and an electricity storage block 100. The electricity storage block 100 includes an element stacked body 11 in which a plurality of cell batteries 101 is stacked and arranged, an integration mechanism that integrates the element stacked body 11, and a duct unit 110 as a press device that presses the element stacked body 11 toward the cooling structure 190.

Figure 3:
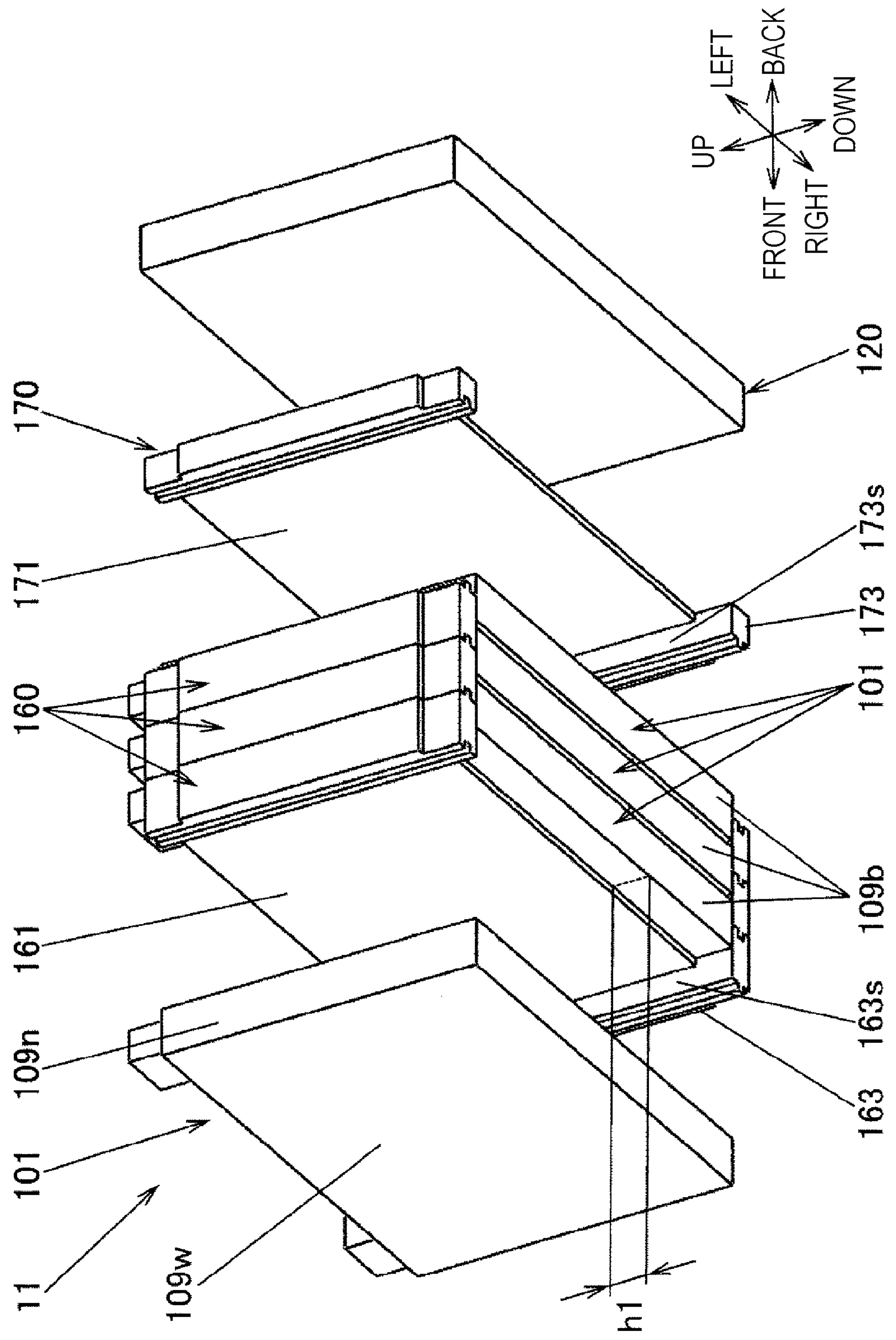
FIG. 3 is an exploded perspective view illustrating a configuration of an element stacked body.

FIG. 3 is an exploded perspective view illustrating a configuration of the element stacked body 11, showing part of the element stacked body 11. As illustrated in FIG. 3, the element stacked body 11 includes the plurality of cell batteries 101 and a plurality of battery holders 160 and 170. Each of the cell batteries 101 is a flat rectangular parallelepiped and has a pair of wide side plates 109*w*. The plurality of cell batteries 101 constituting the element stacked body 11 is stacked and arranged such that the wide side plates 109*w* of the adjacent cell batteries 101 are opposed to each other. As illustrated in FIG. 1, the adjacent cell batteries 101 are inversely oriented such that positive terminals 104 and negative terminals 105 provided on battery covers 108 are reversed in position.

Although not illustrated, the positive terminals 104 and the negative terminals 105 of the adjacent cell batteries 101 are electrically connected together by a bus bar as a flat-plate metal conductive member. That is, the plurality of cell batteries 101 constituting the electricity storage block 100 according to this embodiment is electrically connected in series.

Although not illustrated, the positive terminal 104 of the cell battery 101 arranged at the front end and the negative terminal 105 of the cell battery 101 arranged at the back end are electrically connected in series or in parallel by a conductive member to another electricity storage module or connected by a conductive member to a power-retrieval wire.

Figure 4:
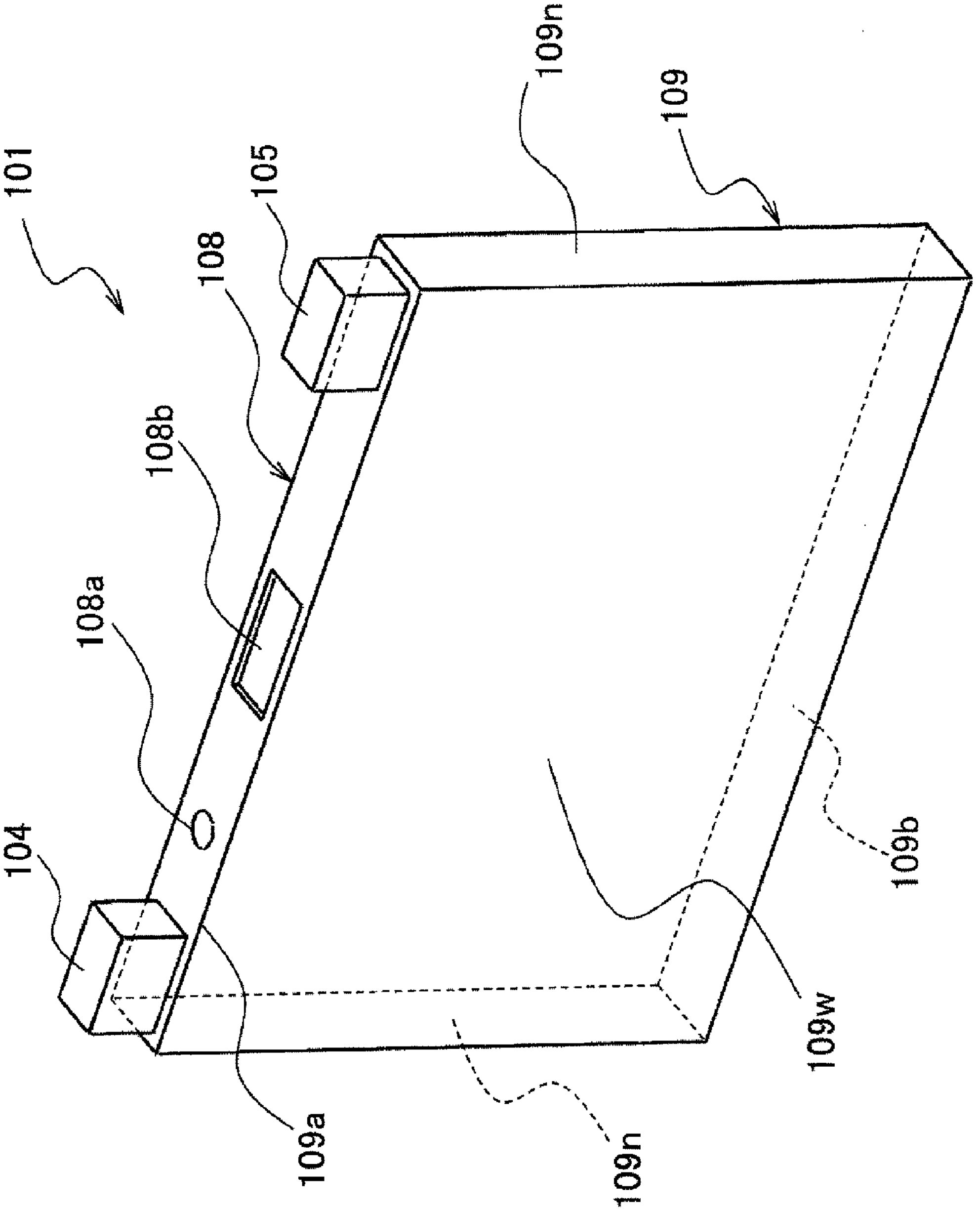
FIG. 4 is a perspective view of a cell battery.

The cell batteries 101 constituting the element stacked body 11 will be described. The plurality of cell batteries 101 has the same structure. FIG. 4 is a perspective view of the cell battery 101. As illustrated in FIG. 4, the cell battery 101 includes a square battery container composed of a battery can 109 and the battery cover 108. The material for the battery can 109 and the battery cover 108 is aluminum or aluminum alloy, for example. The battery can 109 is a rectangular box having an opening 109*a* at one end. The battery cover 108 is a rectangular flat plate that is laser-welded to close the opening 109*a* of the battery can 109. That is, the battery cover 108 seals the battery can 109.

The square battery container composed of the battery cover 108 and the battery can 109 is a hollow rectangular parallelepiped. In the battery container, the wide side plates 109*w* in a pair having the largest area surfaces (wide surface) out of the side surfaces constituting the battery container are opposed to each other, narrow side plates 109*n* in a pair having the smallest area surfaces out of the side surfaces constituting the battery container are opposed to each other, and the battery cover 108 and a bottom plate 109*b* of the battery can 109 are opposed to each other.

The battery cover 108 is provided with the positive terminal 104 and the negative terminal 105. The battery container stores a charging/discharging element (not illustrated) covered with an insulating case (not illustrated). A positive electrode of the charging/discharging element not illustrated is connected to the positive terminal 104, and a negative electrode of the same is connected to the negative terminal 105. Accordingly, electric power is supplied to an external device via the positive terminal 104 and the negative terminal 105 or externally generated electric power is supplied to the charging/discharging element via the positive terminal 104 and the negative terminal 105 to charge the charging/discharging element.

The battery cover 108 is provided with a liquid injection hole for injecting an electrolytic solution into the battery container. The liquid injection hole is sealed with a liquid injection stopper 108*a* after injection of the electrolytic solution. The electrolytic solution may be a non-aqueous electrolytic solution in which a lithium salt such as a hexafluoride lithium phosphate (LiPF6) is dissolved in a carbonate ester-based organic solvent such as an ethylene carbonate, for example.

The battery cover 108 is provided with a gas exhaust valve 108*b*. The gas exhaust valve 108*b* is formed by partially thinning the battery cover 108 through press processing. When the cell battery 101 produces heat and generates a gas due to some abnormality such as overcharging and the pressure in the battery container increases and reaches a predetermined value, the gas exhaust valve 108*b* is opened to eject the gas from the inside to reduce the pressure in the battery container.

As illustrated in FIGS. 1 to 3, the plurality of cell batteries 101 is stacked and arranged in the front-back direction via the battery holders 160 and 170 to constitute the element stacked body 11. The material for the battery holders 160 and 170 is an insulating and heat-resistance resin, for example, an engineering plastic or rubber such as polybutylene terephthalate (PBT) or polycarbonate (PC).

The battery holders 160 and 170 include intermediate holders 160 arranged between the adjacent cell batteries 101 and end holders 170 arranged between the cell battery 101 arranged at the front end and the end plate 120 and between the cell battery 101 arranged at the back end and the end plate 120. The material for the end plates 120 is a metal such as aluminum or aluminum alloy. The intervention of the intermediate holders 160 between the cell batteries 101 provides insulation between the adjacent cell batteries 101. The intervention of the end holders 170 between the end plates 120 and the cell batteries 101 provides insulation between the end plates 120 and the cell batteries 101.

Figure 5:
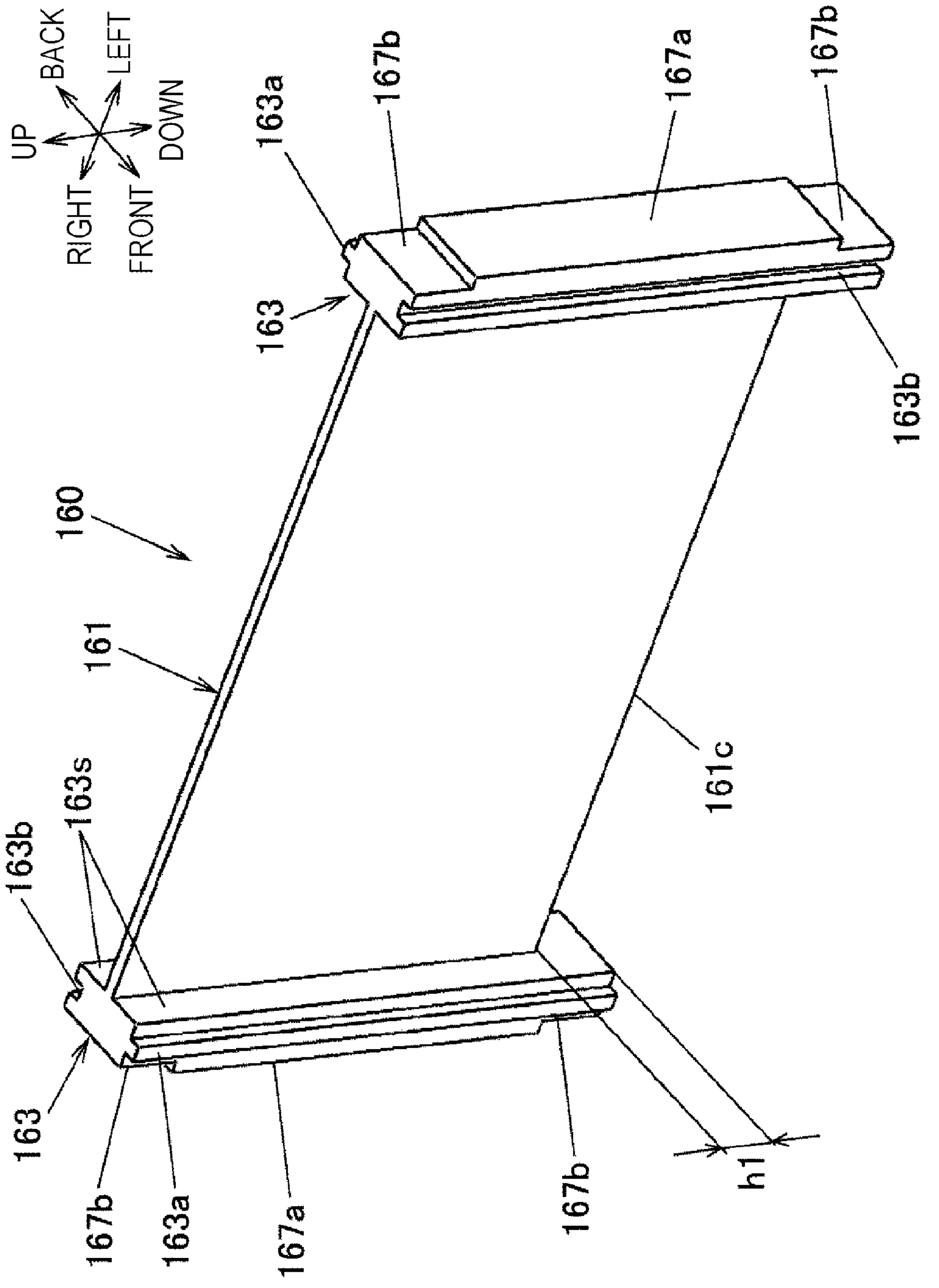
FIG. 5 is a perspective view of an intermediate holder.

FIG. 5 is a perspective view of the intermediate holder 160. The intermediate holder 160 includes a wide surface abutment part 161 and a pair of connection parts 163 provided at the right and left ends of the wide surface abutment part 161.

The wide surface abutment part 161 is a rectangular flat plate that is arranged between the adjacent cell batteries 101 as illustrated in FIG. 3. As illustrated in FIGS. 3 and 5, the front surface of the wide surface abutment part 161 is in abutment with the back-side wide side plate 109*w* of the cell battery 101 at the front side of the intermediate holder 160. The back surface of the wide surface abutment part 161 is in abutment with the front-side wide side plate 109*w* of the cell battery 101 at the back side of the intermediate holder 160.

As illustrated in FIG. 5, each of the connection parts 163 is an approximately rectangular parallelepiped with the longitudinal side along the up-down direction. The right-side connection part 163 has a fitting convex 163*a* extended in the up-down direction on the front surface and has a fitting concave 163*b* extended in the up-down direction on the back surface. The left-side connection part 163 has a fitting concave 163*b* extended in the up-down direction on the front surface and has a fitting convex 163*a* extended in the up-down direction on the back surface.

The fitting convex 163*a* is fitted to the fitting concave 163*b* of the adjacent intermediate holder 160 or a fitting concave 173*b* of the adjacent end holder 170 described later. The fitting concave 163*b* is fitted to the fitting convex 163*a* of the adjacent intermediate holder 160 or a fitting convex 173*a* of the adjacent end holder 170 described later.

The pair of connection parts 163 has inner surfaces 163*s* opposed to each other and divided into two in the front-back direction by the wide surface abutment part 161. The front-side inner surfaces 163*s* are in abutment with the narrow side plates 109*n* of the cell battery 101 at the front side of the intermediate holder 160. The back-side inner surfaces 163*s* are in abutment with the narrow side plates 109*n* of the cell battery 101 at the back side of the intermediate holder 160.

Provided on the outer surfaces of the pair of connection parts 163 are convexes 167*a* protruding outward in the right-left direction. The convexes 167*a* are fitted to openings 143 of side frames 140 described later. The convexes 167*a* are positioned at the center in the up-down direction. Provided at the upper and lower sides of the convexes 167*a* are abutment surface parts 167*b* in abutment with side plates 141 of the side frames 140 described later.

The wide surface abutment part 161 has a rectangular cutout 161*c* at the lower portion. In other words, the lower ends of the connection parts 163 protrude more downward than the wide surface abutment part 161. In this embodiment, the lower end surfaces of the connection parts 163 are positioned more downward by a distance h1 than the lower end surface of the wide surface abutment part 161. As illustrated in FIG. 3, the cell battery 101 is arranged such that the outer surface of the bottom plate 109*b* and the lower end surfaces of the connection parts 163 are flush with each other. That is, the outer surface of the bottom plate 109*b* of the cell battery 101 is positioned more downward by the distance h1 than the lower end surface of the wide surface abutment part 161.

Figure 6:
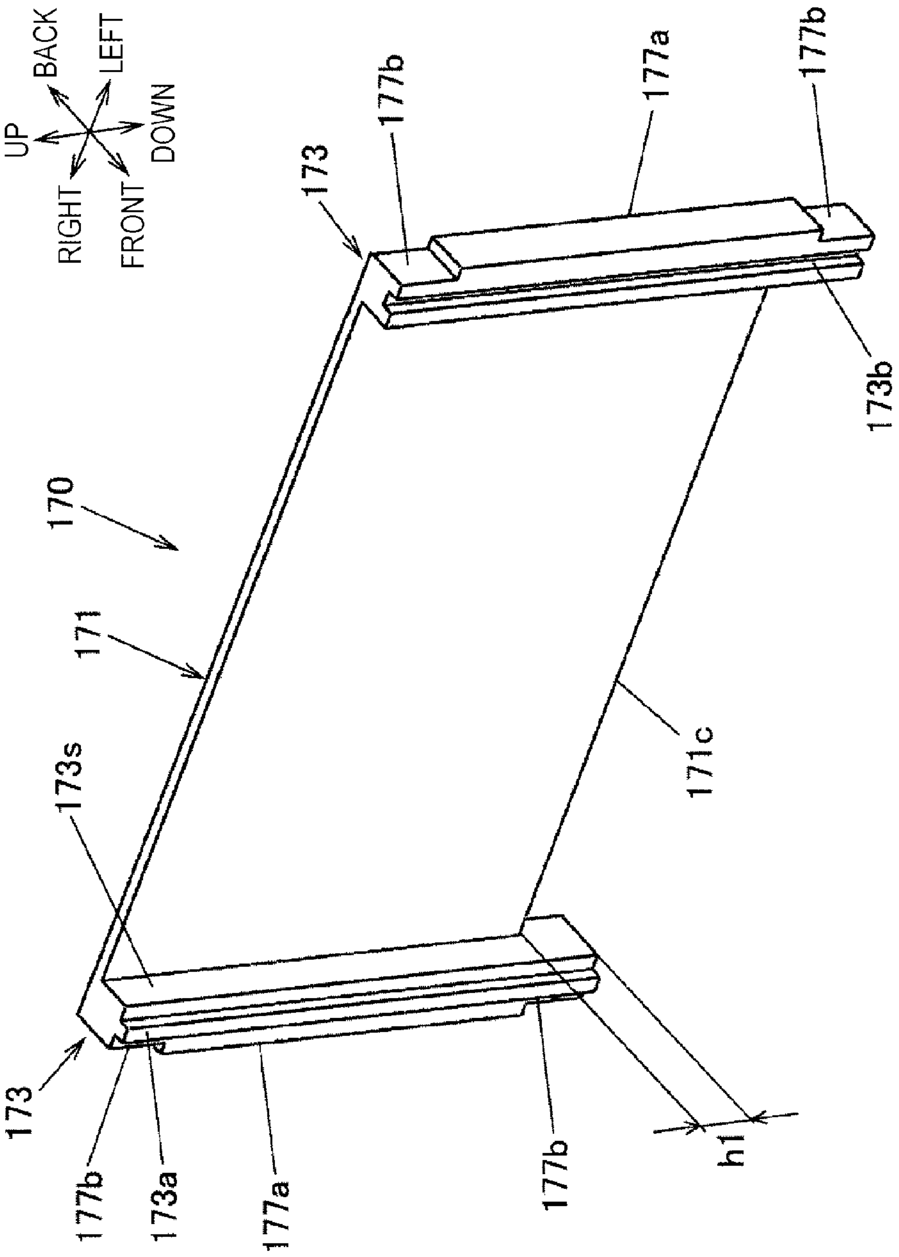
FIG. 6 is a perspective view of an end holder.

FIG. 6 is a perspective view of the end holder 170. The end holder 170 includes a wide surface abutment part 171 and a pair of connection parts 173 provided at the right and left ends of the wide surface abutment part 171.

The end holders 170 are arranged in the front-back direction as illustrated in FIG. 3, that is, are arranged between the cell batteries 101 at both the ends of the element stacked body 11 in the direction of stacking and the end plates 120 described later. The end holder 170 positioned at the front end of the element stacked body 11 and the end holder 170 positioned at the back end of the element stacked body 11 are the same in shape. Accordingly, the end holder 170 positioned at the back end of the element stacked body 11 will be described later as a representative. FIG. 6 illustrates arrows that show the up-down, right-left, and front-back directions relative to the posture of the end holder 170 positioned at the back end of the element stacked body 11.

As illustrated in FIGS. 3 and 6, the front surface of the wide surface abutment part 171 is in abutment with the back-side wide side plate 109*w* of the cell battery 101 at the front side of the end holder 170. The back surface of the wide surface abutment part 171 is in abutment with the end plate 120.

As illustrated in FIG. 6, the connection parts 173 are approximately rectangular parallelepiped with the longitudinal side along the up-down direction. The right-side connection part 173 has a fitting convex 173*a* extended in the up-down direction on the front surface, and the left-side connection part 173 has a fitting concave 173*b* extended in the up-down direction on the front surface. Although not illustrated, the end holder 170 positioned at the front end of the element stacked body 11 is reversed 180 degrees with respect to the end holder 170 illustrated in FIG. 6. Accordingly, in the end holder 170 positioned at the front end of the element stacked body 11, the right-side connection part 173 has the fitting concave 173*b* extended in the up-down direction on the back surface, and the left-side connection part 173 has the fitting convex 173*a* extended in the up-down direction on the back surface.

The fitting convexes 173*a* are fitted to the fitting concaves 163*b* of the adjacent intermediate holder 160. The fitting concaves 173*b* are fitted to the fitting convexes 163*a* of the adjacent intermediate holder 160.

The pair of connection parts 173 protrudes forward from the wide surface abutment part 171. The pair of connection parts 173 has inner surfaces 173*s* opposed to each other in abutment with the narrow side plates 109*n* of the cell battery 101.

Provided on the outer surfaces of the pair of connection parts 173 are convexes 177*a* protruding outward in the right-left direction. The convexes 177*a* are fitted to the openings 143 of the side frames 140 described later. The convexes 177*a* are positioned at the center in the up-down direction. Provided at the upper and lower sides of the convexes 177*a* have abutment surface parts 177*b* in abutment with the side plates 141 of the side frames 140 described later.

The wide surface abutment part 171 has a rectangular cutout 171*c* at the lower portion. In other words, the lower ends of the connection parts 173 protrude more downward than the wide surface abutment part 171. In this embodiment, the lower end surfaces of the connection parts 173 are positioned more downward by the distance h1 than the lower end surface of the wide surface abutment part 171. The cell battery 101 is arranged such that the outer surface of the bottom plate 109*b* and the lower end surfaces of the connection parts 173 are flush with each other. That is, the outer surface of the bottom plate 109*b* of the cell battery 101 is positioned more downward by the distance h1 than the lower end surface of the wide surface abutment part 171.

As illustrated in FIGS. 1 and 2, the element stacked body 11 is held by an integration mechanism. The integration mechanism includes the pair of end plates 120 and the pair of side frames 140 to bind firmly the plurality of cell batteries 101 stacked and arranged via the battery holders 160 and 170.

The endplates 120 are rectangular flat plates formed in almost the same size as the cell batteries 101. The pair of end plates 120 are arranged at the front and back sides of the element stacked body 11 to sandwich the element stacked body 11 in the front-back direction, that is, in the direction of stacking.

The pair of side frames 140 is arranged symmetrically at the right and left sides of the element stacked body 11. As illustrated in FIG. 1, each of the side frames 140 includes a side plate 141 as a rectangular flat plate with a rectangular opening 143 and bend parts 142 bending 90 degrees in the same direction at the front and back ends of the side plate 141. The side plate 141 includes a pair of side surface abutment parts 141*a* extended in parallel to each other between the front-side endplate 120 and the back-side endplate 120 and a pair of engagement parts 141*b* extended in parallel to each other between the upper and lower ends of the element stacked body 11, and have an approximately square-frame shape as seen from the right-left direction. Each of the side frames 140 is fabricated by cutting out a metal plate such as a stainless steel plate or steel plate in a predetermined width, punching the center of the plate, and folding and bending the ends of the plate.

When the connection parts 163 and 173 are connected together to assemble the element stacked body 11, the convexes 167*a* of the intermediate holders 160 (see FIG. 5) and the convexes 177*a* of the end holders 170 (see FIG. 6) constitute rectangular parallelepiped-shaped convexes 168 as a whole. The openings 143 are adapted to the outer shape of the convexes 168. When the convexes 168 are fitted to the openings 143, the side surface abutment parts 141*a* are in abutment with the abutment surface parts 167*b* of the intermediate holders 160 (see FIG. 5) and the abutment surface parts 177*b* of the end holders 170 (see FIG. 6).

The upper and lower opening edges of the openings 143 engage with the upper and lower edges of the convexes 168, and the front and back opening edges of the openings 143 engage with the front and back edges of the convexes 177*a* of the end holders 170.

While being in abutment with the end plates 120, the bend parts 142 are screwed into the endplates 120 by screws 150. When the bend parts 142 are screwed into the end plates 120, the battery holders 160 and 170 and the cell batteries 101 sandwiched between the pair of end plates 120 are held in the state of being compressed by a predetermined amount. In this manner, when the element stacked body 11 is firmly bound by the integration mechanism, the positions of the plurality of intermediate holders 160 and end holders 170 are regulated in the up-down, front-back, and right-left directions. As a result, the positions of the cell batteries 101 sandwiched between the battery holders 160 and 170 are regulated in the front-back direction, and the positions of the cell batteries 101 sandwiched between the pairs of connection parts 163 and 173 of the battery holders 160 and 170 are regulated in the right-left direction. In addition, the wide surface abutment parts 161 and 171 and the wide side plates 109*w* of the cell batteries 101 are in abutment with each other, and the inner surfaces 163*s* and 173*s* of the connection parts 163 and 173 and the narrow side plates 109*n* of the cell batteries 101 are in abutment with each other, whereby the positions of the cell batteries 101 are regulated in the up-down direction due to frictional force on the contact surfaces.

In the foregoing description of this embodiment, the side frames 140 are fixed to the end plates 120 by use of the screws 150. Alternatively, the side frames 140 may be fixed to the end plates 120 by use of bolts or rivets or through swaging or welding.

The element stacked body 11 firmly bound and integrated by the integration mechanism is assembled into the cooling structure 190. As illustrated in FIG. 2, the cooling structure 190 has a rectangular parallelepiped-shaped heat transfer plate 191, a cooling pipe 192 arranged inside the heat transfer plate 191, and a thermally-conductive sheet 180 arranged on the heat transfer plate 191. The heat transfer plate 191 and the cooling pipe 192 are formed from highly thermal-conductive metal material such as aluminum or aluminum alloy.

The cooling pipe 192 is a cylindrical pipe with a circular cross section that forms inside a refrigerant flow path through which a cooling heat medium such as an ethylene glycol solution (hereinafter, referred to as refrigerant) flows. Although not illustrated, the cooling pipe 192 is entirely U-shaped, has a folded part in the vicinity of the back end of the heat transfer plate 191 such that the refrigerant makes a U-turn, and has two straight pipe parts arranged along the front-back direction. As illustrated in FIG. 2, a refrigerant inlet and a refrigerant outlet of the cooling pipe 192 are provided at the front end of the heat transfer plate 191.

Although not illustrated, the refrigerant flowing through the cooling pipe 192 is supplied to the refrigerant inlet by a heat exchange system composed of a pump, a radiator, a cooling fan and the like. The refrigerant discharged from the refrigerant outlet is collected by the heat exchange system for cooling.

The thermally-conductive sheet 180 is about 2 mm thick and has favorable thermal conductivity and electric insulation property. The thermally-conductive sheet 180 has preferably a thermal conductivity of about 1 to 5 W/m·K. The thermally-conductive sheet 180 is also of elasticity.

As illustrated in FIGS. 1 and 2, a duct unit 110 is provided on the top of the element stacked body 11 to guide a gas discharged from the gas exhaust valves 108*b* of the plurality of cell batteries 101 to the outside of the vehicle. The duct unit 110 is formed from a metal plate such as a stainless steel plate or a steel plate. The duct unit 110 has a gas guide part 111 extended along the direction of stacking in the element stacked body 11, that is, along the front-back direction. The gas guide part 111 is a hollow rectangular pipe member that forms a gas flow path with a rectangular cross section from an upper plate, a lower plate, and a pair of side plates connecting the upper and lower plates. Although not illustrated, the gas guide part 111 has gas introduction openings formed in the lower plate at positions corresponding to the gas exhaust valves 108*b* of the cell batteries 101.

As illustrated in FIG. 2, a seal member 115 of an insulating resin is arranged at a part of connection between the gas exhaust valves 108*b* and the gas guide part 111. The seal member 115 extends in the front-back direction between the front-side endplate 120 and the back-side end plate 120. The seal member 115 has openings 115*a* at positions corresponding to the gas exhaust valves 108*b* of the cell batteries 101.

The duct unit 110 has a pair of leg parts 112 extended downward from the front end of the gas guide part 111 and a pair of leg parts 112 extended downward from the back end of the gas guide part 111. Each of the leg parts 112 has a leg part attachment piece 112*a* to be screwed by a screw 151 into the heat transfer plate 191. The gas guide part 111 has guide part attachment pieces 111*a* to be screwed by screws 152 into the end plates 120 in the vicinities of the front and back ends of the gas guide part 111.

As illustrated in FIG. 1, when the leg part attachment pieces 112*a* are screwed into the heat transfer plate 191 and the guide part attachment pieces 111*a* are screwed into the upper surfaces of the end plates 120, the element stacked body 11 integrated by the integration mechanism is pressed toward the thermally-conductive sheet 180 arranged on the heat transfer plate 191, that is, downward.

Each of the cell batteries 101 is sandwiched between the wide surface abutment parts 161 and 171 of the battery holders 160 and 170, and sandwiched between the pair of connection parts 163 and 173 of the battery holders 160 and 170. Accordingly, frictional force acts on the contact surfaces of the wide surface abutment parts 161 and 171 and the wide side plates 109*w* of the cell battery 101 and the contact surfaces of the inner surfaces 163*s* and 173*s* of the connection parts 163 and 173 of the battery holders 160 and 170 and the narrow side plates 109*n* of the cell battery 101. As a result, when the end plates 120 are pressed downward by the duct unit 110, the frictional force acting on the surfaces of the wide side plates 109*w* of the cell batteries 101 and the frictional force acting on the surfaces of the narrow side plates 109*n* of the cell batteries 101 generate downward pressing force acting on the cell batteries 101.

Further, the gas guide part 111 generates downward pressing force acting on battery covers 102 of the cell batteries 101 from the gas guide part 111 via the seal member 115.

As in the foregoing, in this embodiment, the duct unit 110 serves as a pressing device that presses the element stacked body 11 toward the thermally-conductive sheet 180 arranged on the heat transfer plate 191 (in other words, a pressing device that presses the heat transfer plate 191 toward the element stacked body 11). The duct unit 110 as a pressing device elastically deforms the thermally-conductive sheet 180 sandwiched between the element stacked body 11 and the heat transfer plate 191 such that the thermally-conductive sheet 180 is compressed by a predetermined amount, and holds the thermally-conductive sheet 180 in that state. By compressing the thermally-conductive sheet 180, the thermally-conductive sheet 180 can be closely attached to both the heat transfer surface of the element stacked body 11 and the heat transfer surface of the heat transfer plate 191, thereby resulting in efficient heat exchange.

Accordingly, the element stacked body 11 and the heat transfer plate 191 in the electricity storage block 100 are thermally connected via the thermally-conductive sheet 180. The phrase "thermally connected" herein means that heat exchange between two objects is enabled by thermally-conductive solid materials such as a metal and a resin. Between the two thermally connected objects, heat flows from a higher-temperature object to a lower-temperature object until a thermal equilibrium is reached.

The heat transfer plate 191 exchanges heat with the cell batteries 101 via the thermally-conductive sheet 180 to absorb the heat generated in the cell batteries 101, that is, cool down the cell batteries 101, thereby suppressing a temperature rise in the cell batteries 101. The heat transferred to the heat transfer plate 191 is then transferred to the refrigerant via the cooling pipe 192 and collected by the refrigerant into the heat exchange system.

When the duct unit 110 presses the element stacked body 11 against the thermally-conductive sheet 180 on the heat transfer plate 191, compression reaction force acts on the duct unit 110 via the element stacked body 11 according to the amount of compression of the thermally-conductive sheet 180. Accordingly, the duct unit 110 is set in thickness, shape, dimensions, and material in order to ensure rigidity against the compression reaction force. By decreasing the reaction force acting on the duct unit 110, the weight of the duct unit 110 can be reduced.

Figure 7:
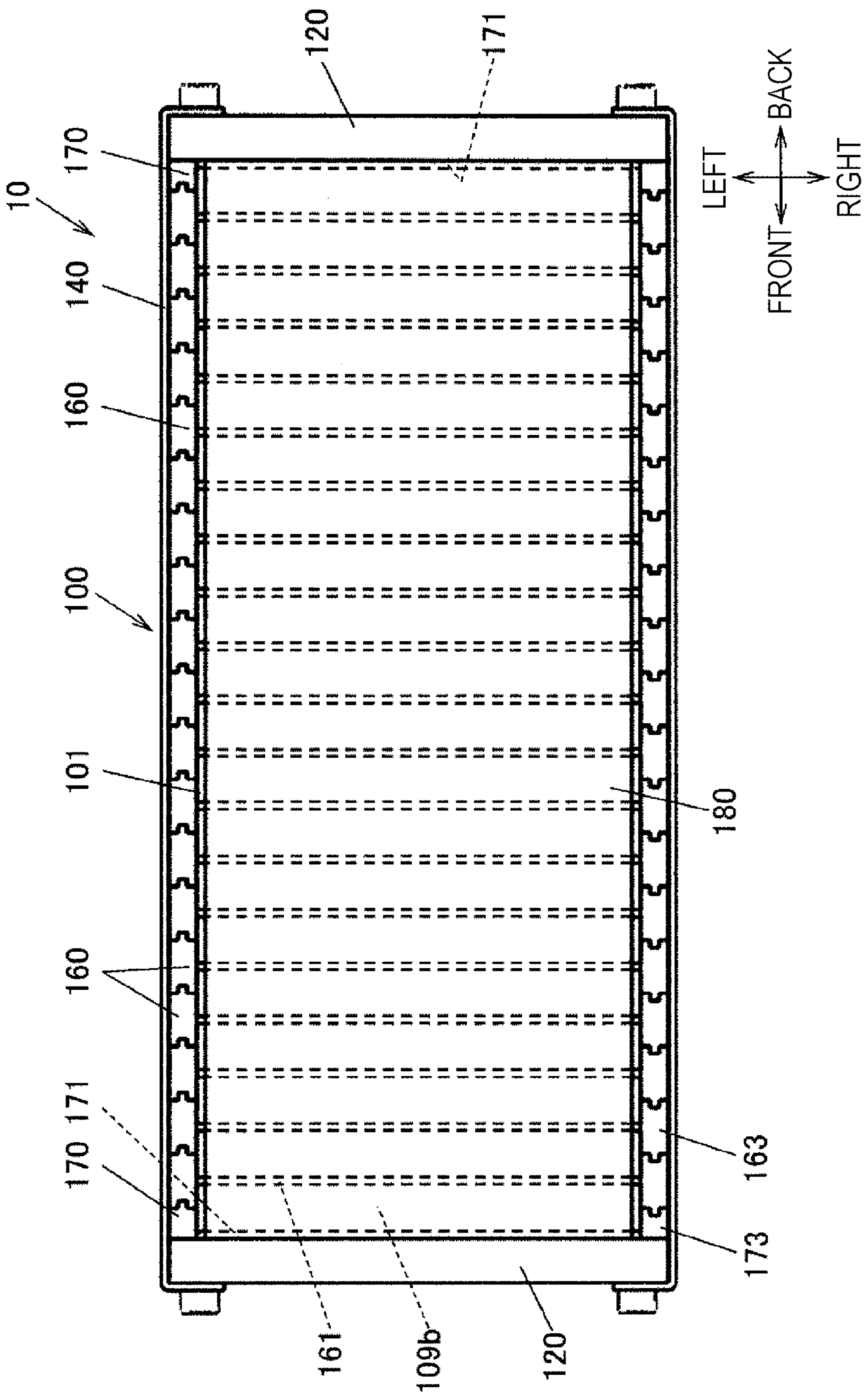
FIG. 7 is a bottom view of an electricity storage block and a thermally-conductive sheet.

In this embodiment, the heat transfer surface of the element stacked body 11 closely attached to the thermally-conductive sheet 180 is set only on the outer surfaces of the bottom plates 109*b* of the cell batteries 101, thereby to minimize the compression reaction force generated by the compression of the thermally-conductive sheet 180. FIG. 7 is a bottom view of the electricity storage block 100 and the thermally-conductive sheet 180. That is, FIG. 7 is a bottom view of the electricity storage module 10 without illustration of the heat transfer plate 191. In FIG. 7, the element stacked body 11 is pressed downward by the duct unit 110, and the thermally-conductive sheet 180 is sandwiched between the element stacked body 11 and the heat transfer plate 191 and compressed by a predetermined amount.

The thermally-conductive sheet 180 is a rectangular sheet that has a front-back dimension almost the same as the front-back dimension of the element stacked body 11 and a right-left dimension slightly smaller than the right-left dimension of the element stacked body 11.

The amount of compression of the thermally-conductive sheet 180 needs to be controlled without occurrence of permanent strain on the thermally-conductive sheet 180. In this embodiment, the amount of compression of the thermally-conductive sheet 180 is set to about 0.2 to 0.4 mm taking into account variations in the dimensions of the cell batteries 101 pressed against the thermally-conductive sheet 180.

Figure 8:
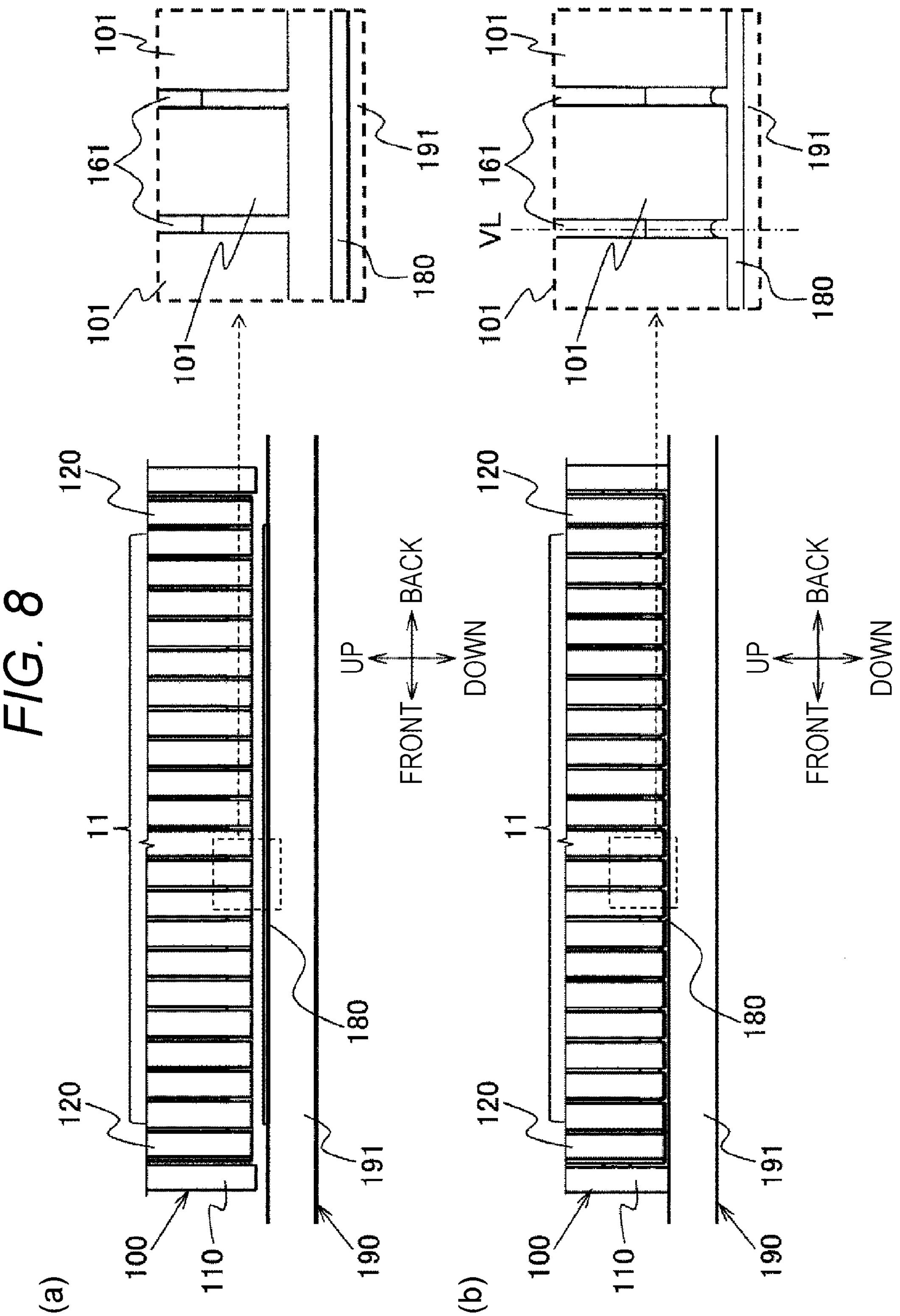
FIG. 8(*a*) is a diagram illustrating the state where the electricity storage block and a cooling structure are not yet thermally connected, and FIG. 8(*b*) is a diagram illustrating the state where the electricity storage block and the cooling structure are thermally connected.

FIG. 8(*a*) is a diagram illustrating the state where the electricity storage block 100 and the cooling structure 190 are not yet thermally connected, and FIG. 8 (*b*) is a diagram illustrating the state where the electricity storage block 100 and the cooling structure 190 are thermally connected. FIGS. 8(*a*) and 8(*b*) illustrate schematically the cross section of the electricity storage module 10 from the left side, with partial enlarged views.

When the element stacked body 11 is pressed against the thermally-conductive sheet 180, the thermally-conductive sheet 180 is compressed in the up-down direction (that is, the thickness direction), and is extended in the right-left and front-back directions. In addition, as illustrated in the partial enlargement view of FIG. 8(*b*), a part of the thermally-conductive sheet 180 escapes and deforms in a gap between the adjacent cell batteries 101. When the thickness of the thermally-conductive sheet 180 before the compressive deformation is designated as ts1, the protrusion length h1 of the outer surfaces of the bottom plates 109*b* of the cell batteries 101 relative to the lower end surfaces of the wide surface abutment parts 161 can be set to be equal to or more than the thickness ts1 of the thermally-conductive sheet 180 (ts1≤h1), thereby to prevent contact between the wide surface abutment parts 161 and the thermally-conductive sheet 180. Similarly, it is possible to prevent contact between the wide surface abutment parts 171 of the end holders 170 and the thermally-conductive sheet 180.

As illustrated in FIGS. 7 and 8(*b*), the thermally-conductive sheet 180 is compressed over the entire lower surface of the element stacked body 11. Accordingly, the lower end surfaces of the wide surface abutment parts 161 of the intermediate holders 160 are opposed to the thermally-conductive sheet 180. That is, as illustrated in the partial enlargement view of FIG. 8(*b*), the wide surface abutment parts 161 and the thermally-conductive sheet 180 are arranged on a predetermined virtual straight line VL extended in the up-down direction. Similarly, the lower end surfaces of the wide surface abutment parts 171 of the end holders 170 are opposed to the thermally-conductive sheet 180. That is, the wide surface abutment parts 171 and the thermally-conductive sheet 180 are arranged on a virtual straight line extended in the up-down direction.

As described above, the wide surface abutment parts 161 and 171 are opposed to the thermally-conductive sheet 180. However, the wide surface abutment parts 161 and 171 have the cutouts 161*c* and 171*c* at the lower portions, and when the element stacked body 11 is pressed against the thermally-conductive sheet 180, the thermally-conductive sheet 180 and the lower end surfaces of the wide surface abutment parts 161 and 171 do not contact each other. As a result, only the bottom plates 109*b* of the battery cans 109 of the cell batteries 101 can be closely attached as a heat transfer surface to the thermally-conductive sheet 180.

This embodiment was verified in the effect of reduction in compression reaction force with a comparative example in which the outer surfaces of the bottom plates 109*b* of the battery cans 109 and the lower end surfaces of the wide surface abutment parts 161 and 171 are flush with each other. In this embodiment, the wide surface abutment parts 161 and 171 do not contact the thermally-conductive sheet 180, which reduces the contact area between the thermally-conductive sheet 180 and the element stacked body 11 as compared to the comparative example. That is, according to this embodiment, it is possible to increase the force per unit area applied to the bottom plates 109*b* of the cell batteries 101.

The comparative example and this embodiment were compared in pressing force resulting from the compression of the thermally-conductive sheet 180 at the same compression rate (for example, 40%). When this embodiment had pressing force (load) Fa necessary for the compression of the thermally-conductive sheet 180 at the compression rate of 40% and the comparative example had pressing force (load) Fb necessary for the compression of the thermally-conductive sheet 180 at the compression rate of 40%, Fa/Fb became about 0.8. That is, according to this embodiment, it is possible to reduce the compression reaction force resulting from the compressive deformation of the thermally-conductive sheet 180 by about 20 percent as compared to the case where the wide surface abutment parts 161 and 171 contact the thermally-conductive sheet 180.

To attach all of the cell batteries 101 constituting the element stacked body 11 closely to the thermally-conductive sheet 180, it is necessary to add pressing force taking into account variations in dimensions of the cell batteries 101. In this embodiment, the compression reaction force can be reduced as described above. Accordingly, even when the cell batteries 101 are varied in dimensions, the cell batteries 101 can be thermally connected to the heat transfer plate 191 via the thermally-conductive sheet 180 in a stable manner.

As described above, in the first embodiment, the element stacked body 11 includes the intermediate holders 160 that are arranged between the adjacent cell batteries 101 and are in abutment with the wide side plates 109*w* of the cell batteries 101 and the end holders 170 that are arranged between the cell batteries 101 and the end plates 120 and are in abutment with the wide side plates 109*w* of the cell batteries 101. The outer surfaces of the bottom plates 109*b* of the cell batteries 101, that is, the heat transfer surfaces of the cell batteries 101 protrude toward the heat transfer plate 191 more than the end surfaces of the wide surface abutment parts 161 and 171 at the heat transfer plate 191 side. Accordingly, when the element stacked body 11 is pressed by the duct unit 110 toward the thermally-conductive sheet 180 arranged on the heat transfer plate 191, only the bottom plates 109*b* of the cell batteries 101 in the element stacked body 11 are thermally connected to the heat transfer plate 191 via the thermally-conductive sheet 180.

According to this embodiment described above, the following advantages can be produced.

In this embodiment, single surfaces of the battery containers of the cell batteries 101 are attached closely to the thermally-conductive sheet 180 and the wide surface abutment parts 161 and 171 of the battery holders 160 and 170 are not in contact with the thermally-conductive sheet 180. This reduces the compression reaction force of the thermally-conductive sheet 180 acting on the duct unit 110 as a pressing device. As a result, the duct unit 110 and the integration mechanism can be simplified in structure to allow the electricity storage module 10 to be more lightweight and lower in costs. In addition, it is possible to prevent a position gap among the cell batteries 101 resulting from the frictional force on the contact surfaces between the cell batteries 101 and the battery holders 160 and 170.

—Second Embodiment—

A second embodiment of the present invention will be described with reference to FIGS. 9 to 13. In these drawings, the components identical or equivalent to those in the first embodiment are given the same reference signs as those in the first embodiment and descriptions thereof are omitted. The differences from the first embodiment will be described below in detail.

Figure 9:
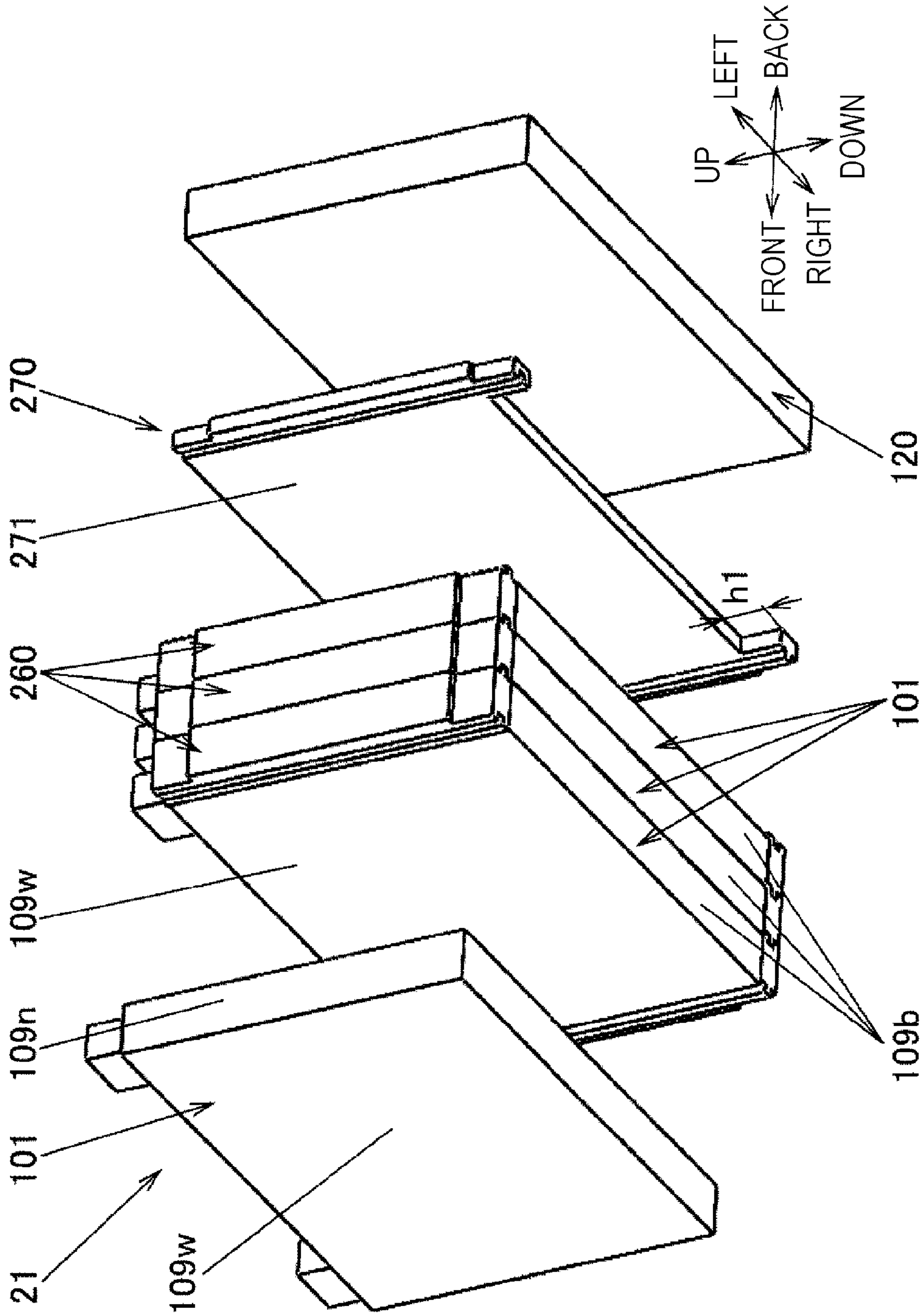
FIG. 9 is an exploded perspective view illustrating a configuration of an element stacked body of an electricity storage module according to a second embodiment of the present invention.
Figure 10:
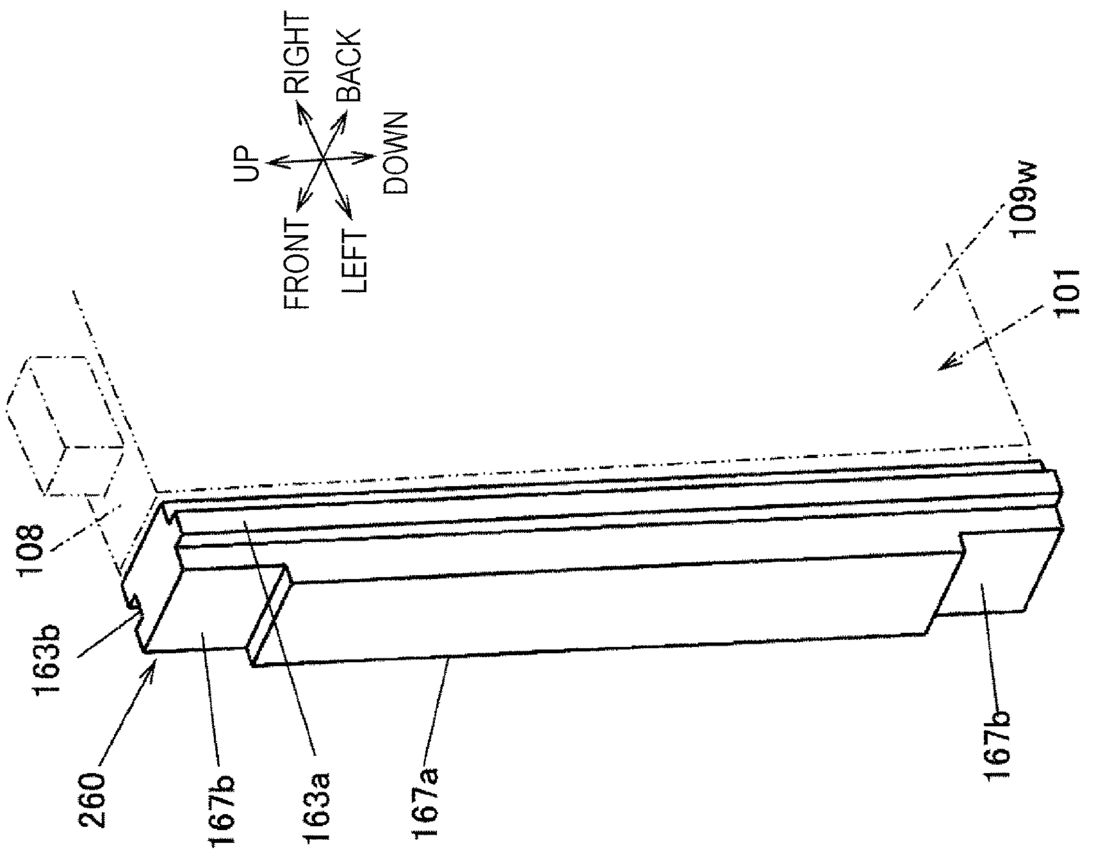
FIG. 10 is a perspective view of an intermediate holder constituting the element stacked body.
Figure 11:
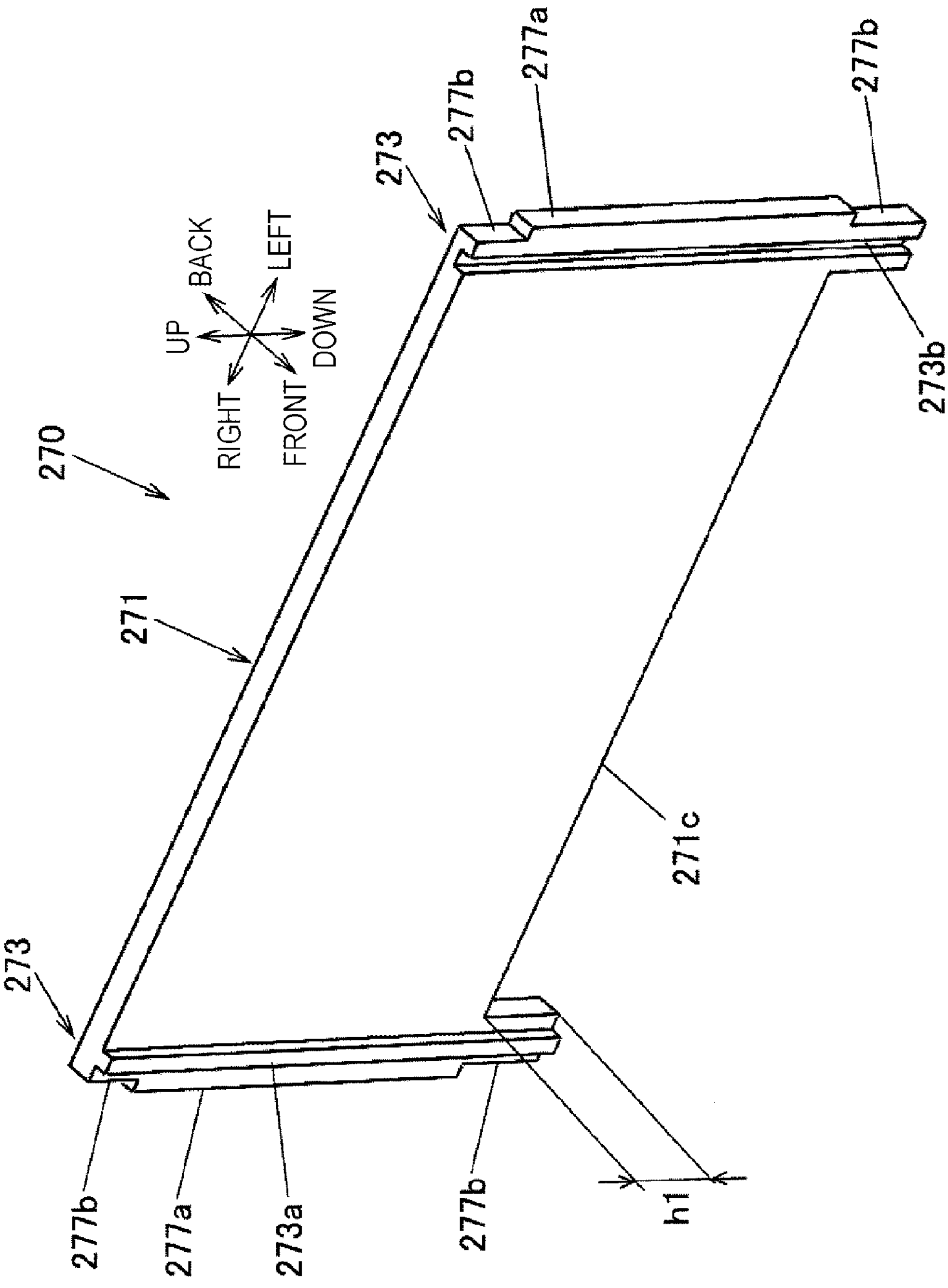
FIG. 11 is a perspective view of an end holder.

FIG. 9 is similar to FIG. 3, which is an exploded perspective view illustrating a configuration of an element stacked body 21 of an electricity storage module according to the second embodiment of the present invention. FIG. 10 is a perspective view of an intermediate holder 260 constituting the element stacked body 21 illustrated in FIG. 9. FIG. 10 illustrates the intermediate holder 260 positioned at the right end of the element stacked body 21 and a part of the cell battery 101 in abutment with the intermediate holder 260 by chain double-dashed lines. FIG. 11 is a perspective view of the end holder 170.

In the first embodiment, each of the intermediate holders 160 is composed of the pair of connection parts 163 and the wide surface abutment part 161 provided between the pair of connection parts 163 (see FIG. 5). In contrast, in the second embodiment, each of the intermediate holders 260 is not provided with a wide surface abutment part in abutment with the wide side plate 109*w* of the cell battery 101 as illustrated in FIGS. 9 and 10. In the second embodiment, an insulating film (not illustrated) with insulation property is firmly stuck to the outer surface of the battery container of the cell battery

101, and the adjacent cell batteries 101 are in contact with each other via the insulating film.

As illustrated in FIGS. 9 and 10, the intermediate holders 260 are approximately rectangular parallelepiped with the longitudinal side along the up-down direction. The pair of intermediate holders 260 is arranged at the right and left of the cell battery 101 in abutment with the narrow side plates 109*n* of the cell battery 101. Each of the intermediate holders 260 is provided with a fitting convex 163*a* extended in the up-down direction along one side of the front-back direction and a fitting concave 163*b* extended in the up-down direction along the other side of the front-back direction. The right and left intermediate holders 260 in a pair are the same in shape. The right and left intermediate holders 260 in a pair are reversed 180 degrees. That is, the right-side intermediate holder 260 has the fitting convex 163*a* at the front side and has the fitting concave 163*b* at the back side. In contrast, the left-side intermediate holder 260 has the fitting concave 163*b* at the front side and has the fitting convex 163*a* at the back side.

The fitting convex 163*a* is fitted to the fitting concave 163*b* of the adjacent intermediate holder 260 or a fitting concave 273*b* of the adjacent end holder 270. The fitting concave 163*b* is fitted to the fitting convex 163*a* of the adjacent intermediate holder 260 or a fitting convex 273*a* of the adjacent end holder 270.

Provided on the outer surfaces of the pair of intermediate holders 260 are convexes 167*a* protruding outward in the right-left direction. The convexes 167*a* are fitted to the openings 143 of the side frames 140. The convexes 167*a* are positioned at the center in the up-down direction. Provided at the upper and lower sides of the convexes 167*a* are abutment surface parts 167*b* in abutment with side plates 141 of the side frames 140 described later.

As illustrated in FIG. 11, each of the end holders 270 includes a wide surface abutment part 271 and a pair of connection parts 273 provided at the right and left ends of the wide surface abutment part 271.

The end holders 270 are almost rectangular flat plates and are arranged in the front-back direction as illustrated in FIG. 9, that is, are arranged between the cell batteries 101 at both the ends of the element stacked body 21 in the direction of stacking and the end plates 120. The end holder 270 positioned at the front end of the element stacked body 21 and the end holder 270 positioned at the back end of the element stacked body 21 are the same in shape. Accordingly, the end holder 270 positioned at the back end of the element stacked body 21 will be described later as a representative. FIG. 11 illustrates arrows that show the up-down, right-left, and front-back directions relative to the posture of the end holder 270 positioned at the back end of the element stacked body 21.

As illustrated in FIGS. 9 and 11, the front surface of the wide surface abutment part 271 is in abutment with the back-side wide side plate 109*w* of the cell battery 101 at the front side of the end holder 270. The back surface of the wide surface abutment part 271 is in abutment with the end plate 120 of the end holder 270.

As illustrated in FIG. 11, the right-side connection part 273 has the fitting convex 273*a* extended in the up-down direction on the front surface, and the left-side connection part 273 has the fitting concave 273*b* extended in the up-down direction on the front surface. Although not illustrated, the end holder 270 positioned at the front end of the element stacked body 21 is reversed 180 degrees with respect to the end holder 270 illustrated in FIG. 11. Accordingly, in the end holder 270 positioned at the front end of the element stacked body 21, the right-side connection part 273 has the fitting concave 273*b* extended in the up-down direction on the back surface, and the left-side connection part 273 has the fitting convex 273*a* extended in the up-down direction on the back surface.

The fitting convexes 273*a* are fitted to the fitting concaves 163*b* of the adjacent intermediate holder 260. The fitting concaves 273*b* are fitted to the fitting convexes 163*a* of the adjacent intermediate holder 260.

Provided on the right and left side surfaces of the pair of connection parts 273 are convexes 277*a* protruding outward in the right-left direction. The convexes 277*a* are fitted to the openings 143 of the side frames 140. The convexes 277*a* are positioned at the center in the up-down direction. Provided at the upper and lower sides of the convexes 277*a* have abutment surface parts 277*b* in abutment with the side plates 141 of the side frames 140.

The wide surface abutment part 271 has a rectangular cutout 271*c* at the lower portion. In other words, the lower ends of the connection parts 273 protrude more downward than the wide surface abutment part 271. In this embodiment, the lower end surfaces of the connection parts 273 are positioned more downward by the distance h1 than the lower end surface of the wide surface abutment part 271. The cell battery 101 is arranged such that the outer surface of the bottom plate 109*b* and the lower end surfaces of the connection parts 273 are flush with each other. That is, the outer surface of the bottom plate 109*b* of the cell battery 101 is positioned more downward by the distance h1 than the lower end surface of the wide surface abutment part 271.

Figure 12:
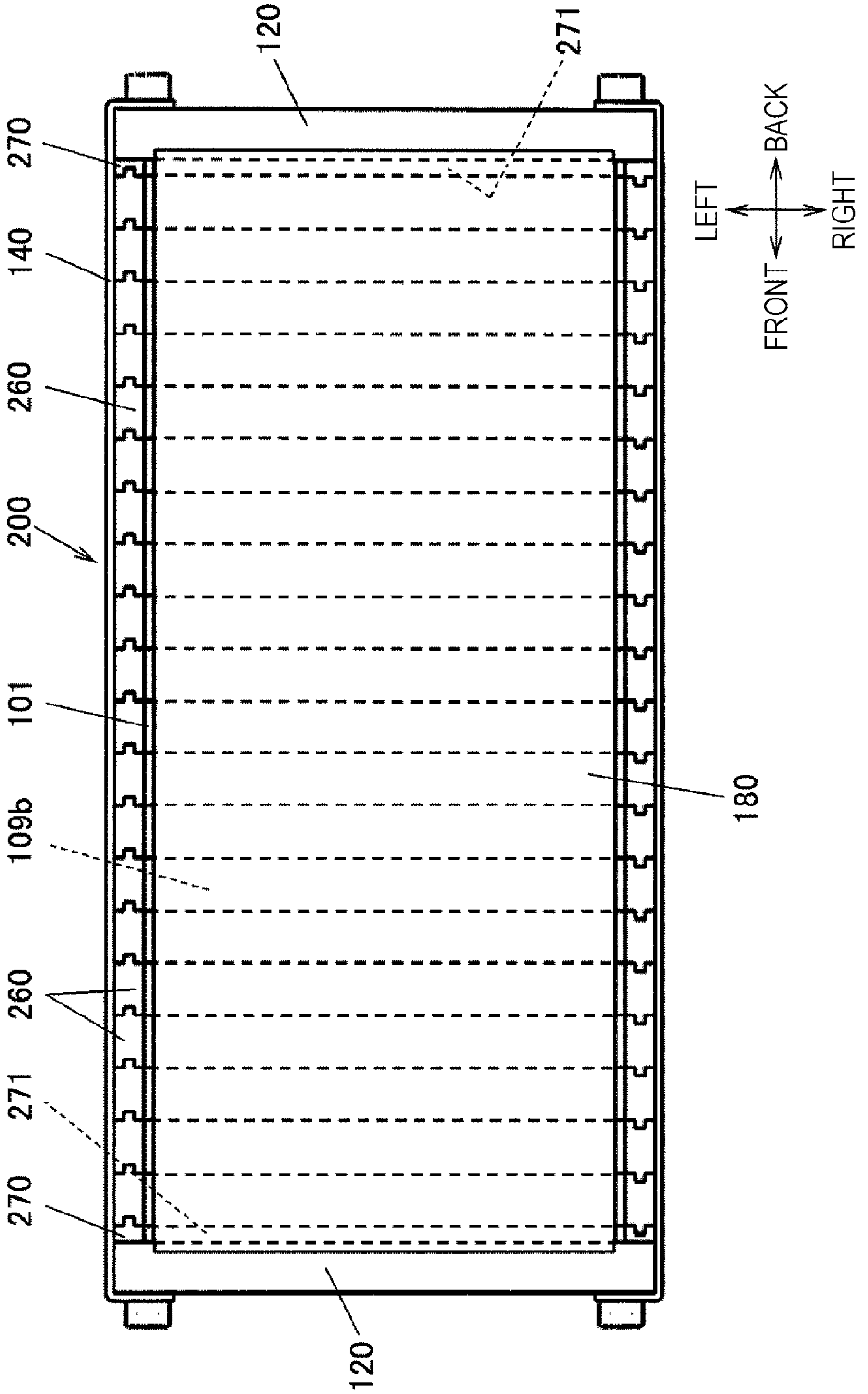
FIG. 12 is a bottom view of an electricity storage block and a thermally-conductive sheet.
Figure 13:
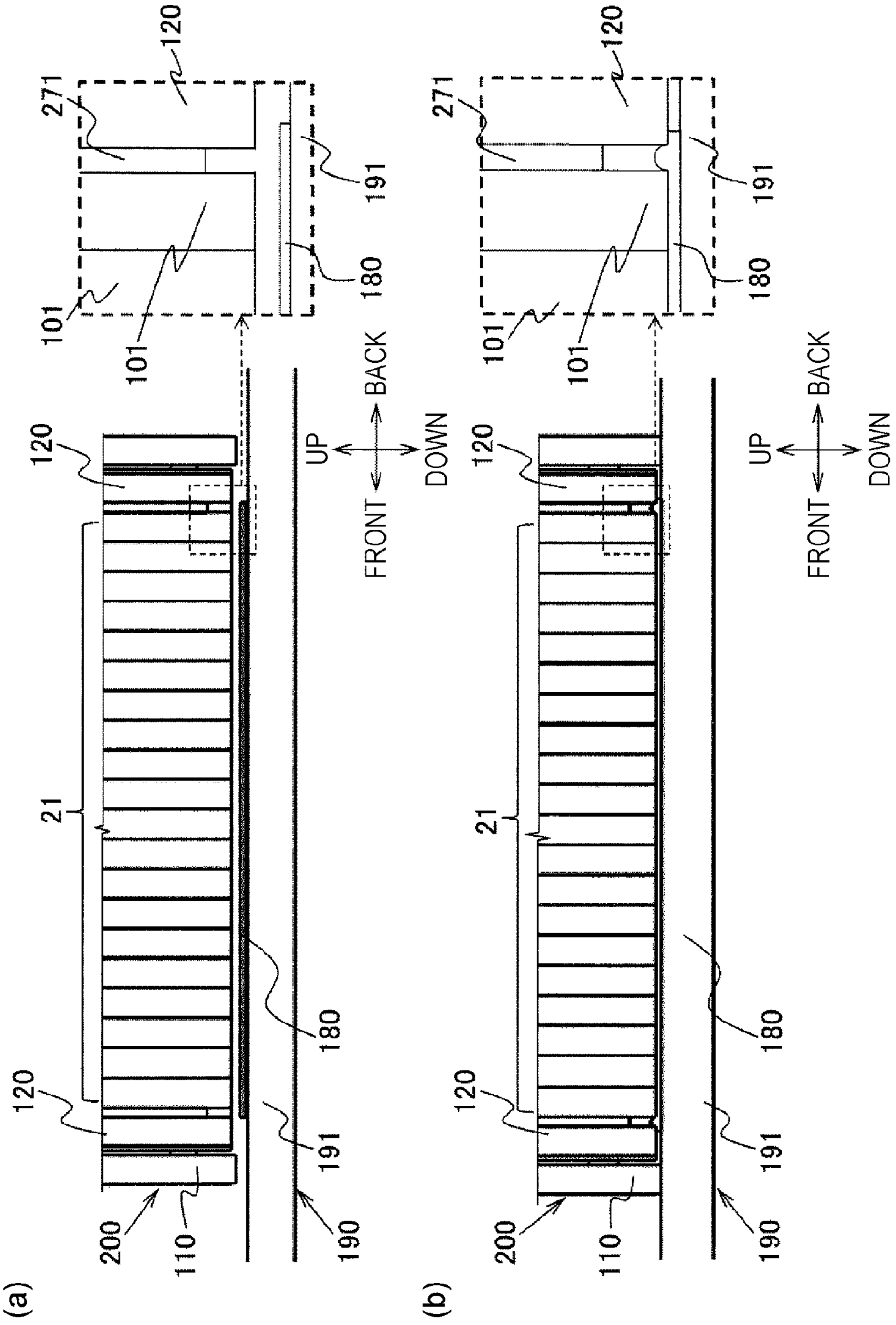
FIG. 13 (*a*) is a diagram illustrating the state where the electricity storage block and a cooling structure are not yet thermally connected, and FIG. 13(*b*) is a diagram illustrating the state where the electricity storage block and the cooling structure are thermally connected.

FIG. 12 is similar to FIG. 7, which is a bottom view of an electricity storage block 200 and the thermally-conductive sheet 180. FIGS. 13(*a*) and 13(*b*) are similar to FIGS. 8(*a*) and 8(*b*). FIG. 13(*a*) is a diagram illustrating the state where the electricity storage block 200 and the cooling structure 190 are not yet thermally connected, and FIG. 13 (*b*) is a diagram illustrating the state where the electricity storage block 200 and the cooling structure 190 are thermally connected.

As illustrated in FIG. 12, the lower end surfaces of the wide surface abutment parts 271 of the end holders 270 are opposed to the thermally-conductive sheet 180.

In the second embodiment, the intermediate holders 160 have no wide surface abutment parts. The end holders 270 have cutouts 271*c* as in the first embodiment. This prevents the wide surface abutment parts 271 from contacting the thermally-conductive sheet 180 when the electricity storage block 200 and the cooling structure 190 are thermally connected.

According to the second embodiment, it is possible to produce the same advantages as those in the first embodiment.

—Third Embodiment—

Figure 14:
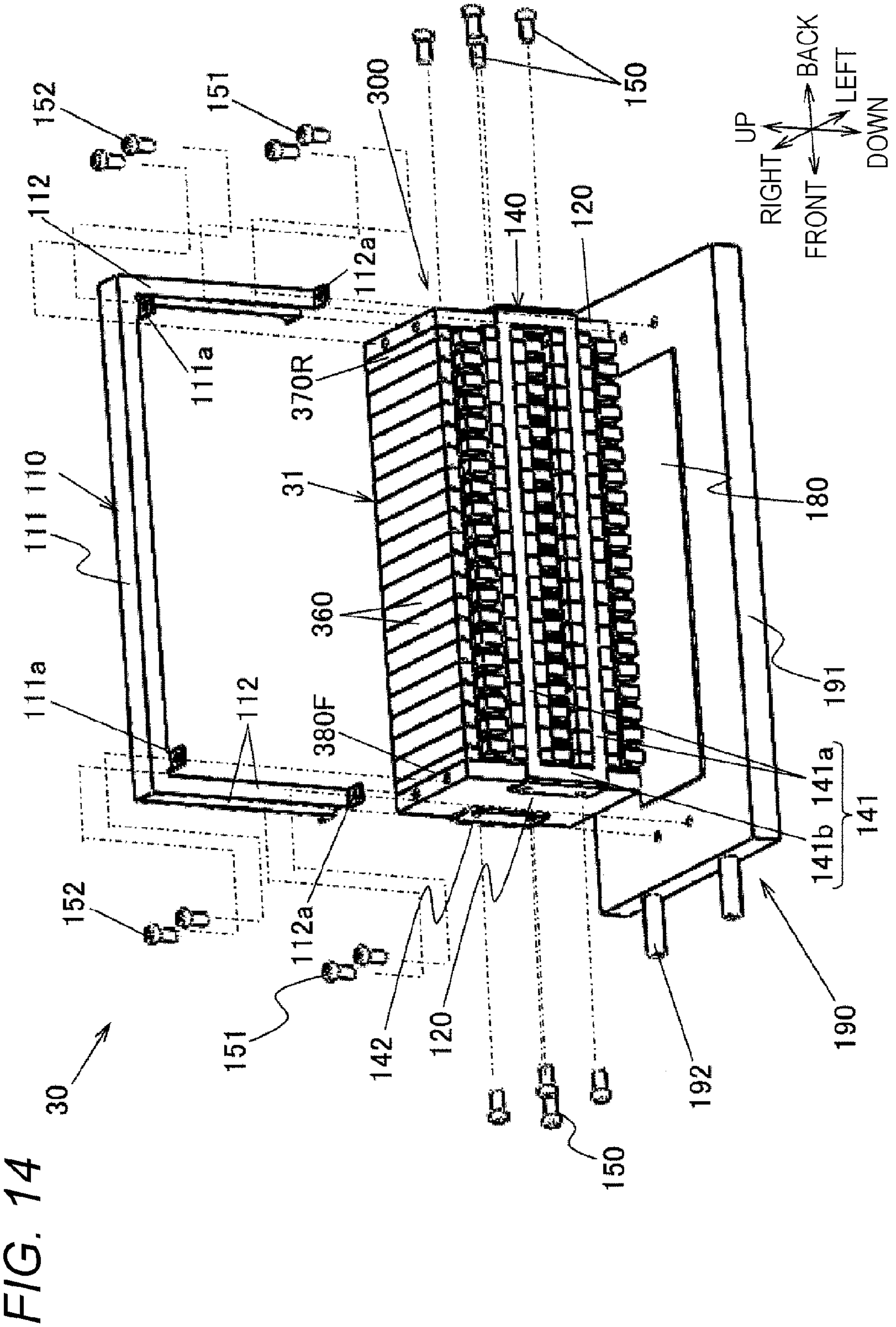
FIG. 14 is an exploded perspective view illustrating a configuration of an electricity storage module according to a third embodiment of the present invention.
Figure 15:
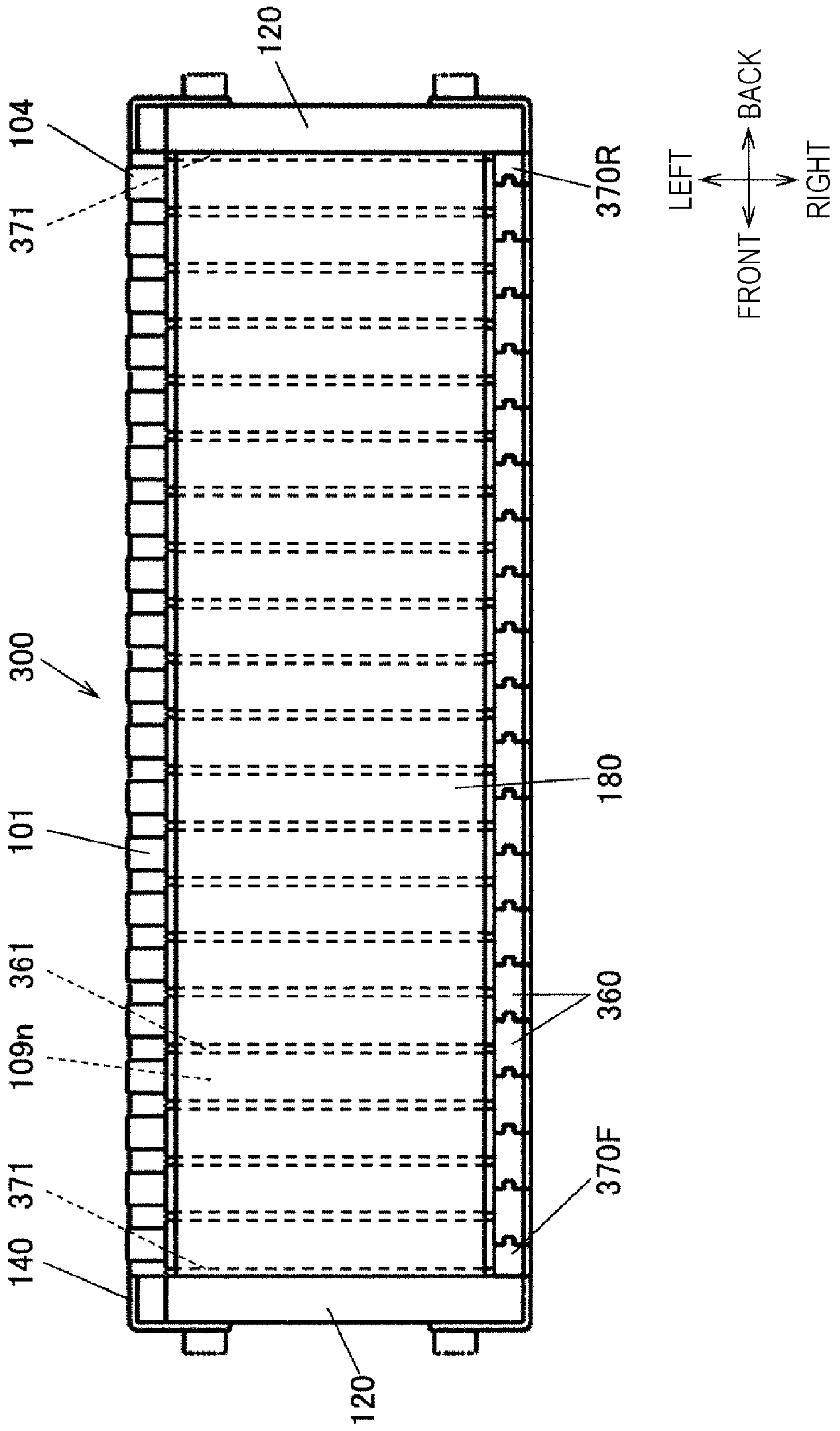
FIG. 15 is a bottom view of an electricity storage block and a thermally-conductive sheet.

A third embodiment of the present invention will be described with reference to FIGS. 14 to 19. In these drawings, the components identical or equivalent to those in the first embodiment are given the same reference signs as those in the first embodiment and descriptions thereof are omitted. The differences from the first embodiment will be described below in detail. FIG. 14 is an exploded perspective view illustrating a configuration of an electricity storage module 30 according to the third embodiment of the present invention. FIG. 15 is a bottom view of an electricity storage block 300 and the thermally-conductive sheet 180.

In the first embodiment, the outer surfaces of the bottom plates 109*b* of the cell batteries 101 serve as heat transfer surfaces attached closely to the thermally-conductive sheet 180, and the positive terminals 104 and the negative terminals 105 are provided on the cell covers 102 opposed to the bottom plates 109*b* (see FIG.

In contrast, in the third embodiment, each of the cell batteries 101 has one of the narrow side plates 109*n* in a pair serving as a heat transfer surface attached closely to the thermally-conductive sheet 180 as illustrated in FIGS. 14 and 15. In the third embodiment, the positive terminals 104 and the negative terminals 105 are arranged on a side surface of an element stacked body 31.

Figure 16:
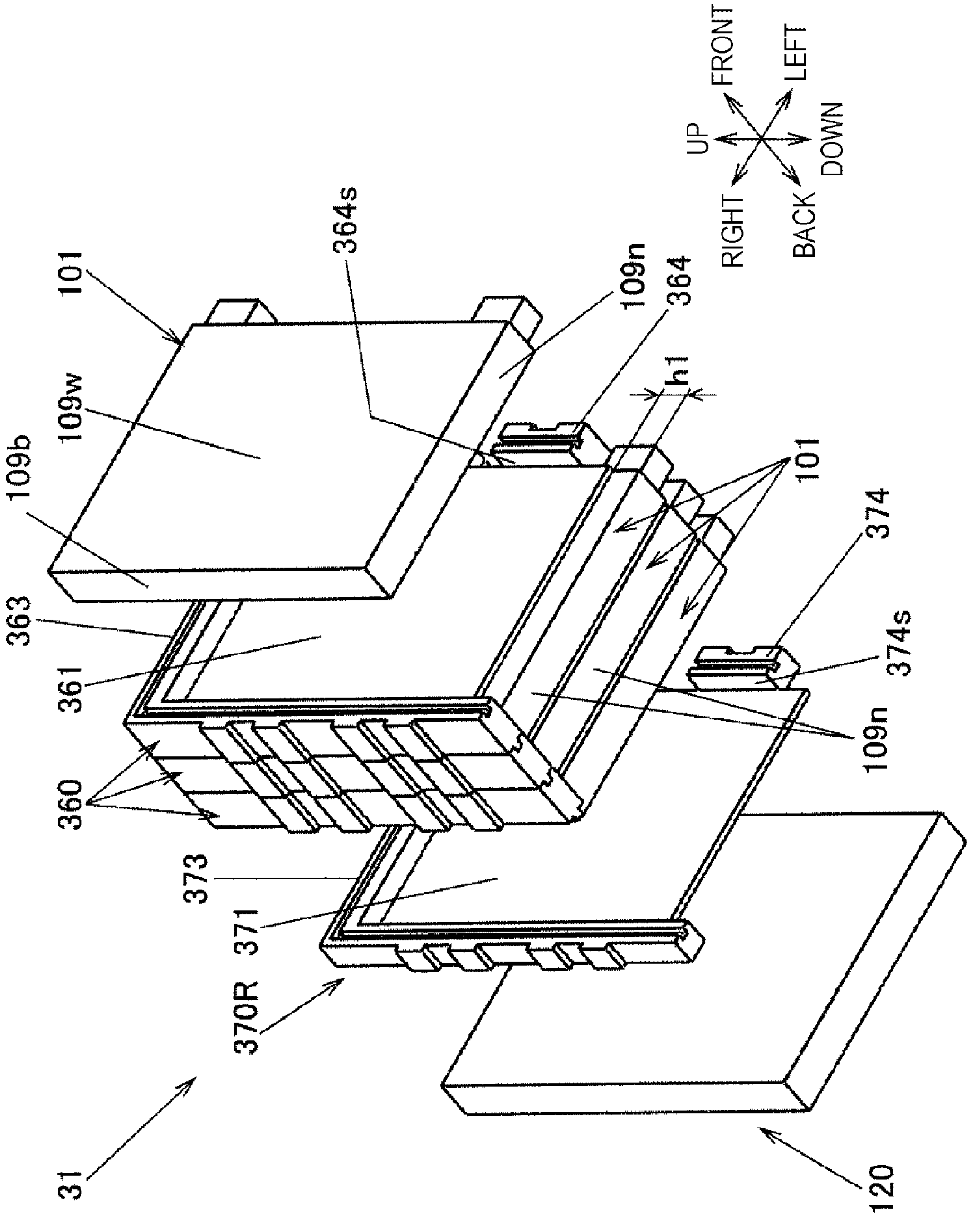
FIG. 16 is an exploded perspective view illustrating a configuration of an element stacked body.
Figure 17:
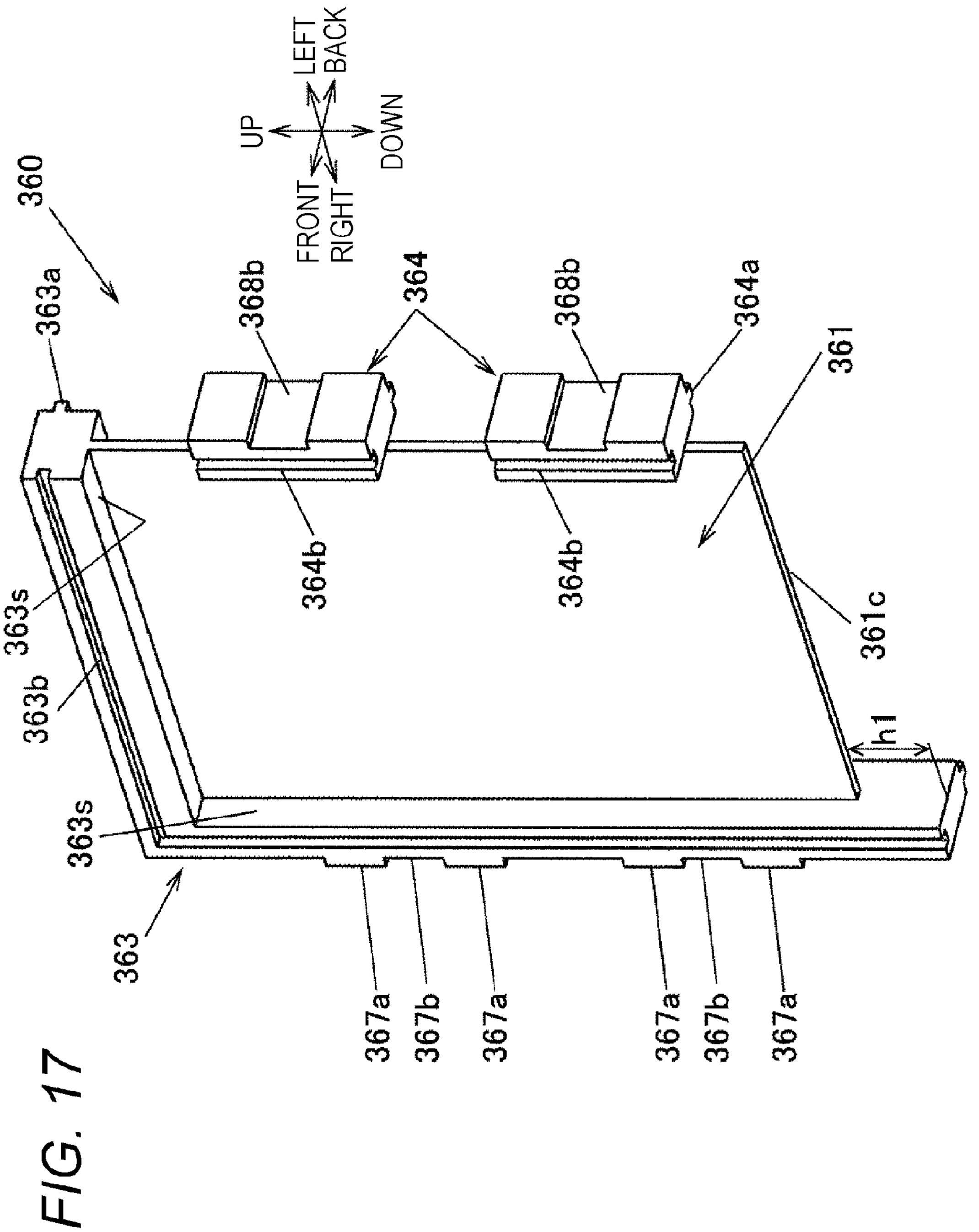
FIG. 17 is a perspective view of an intermediate holder.
Figure 18:
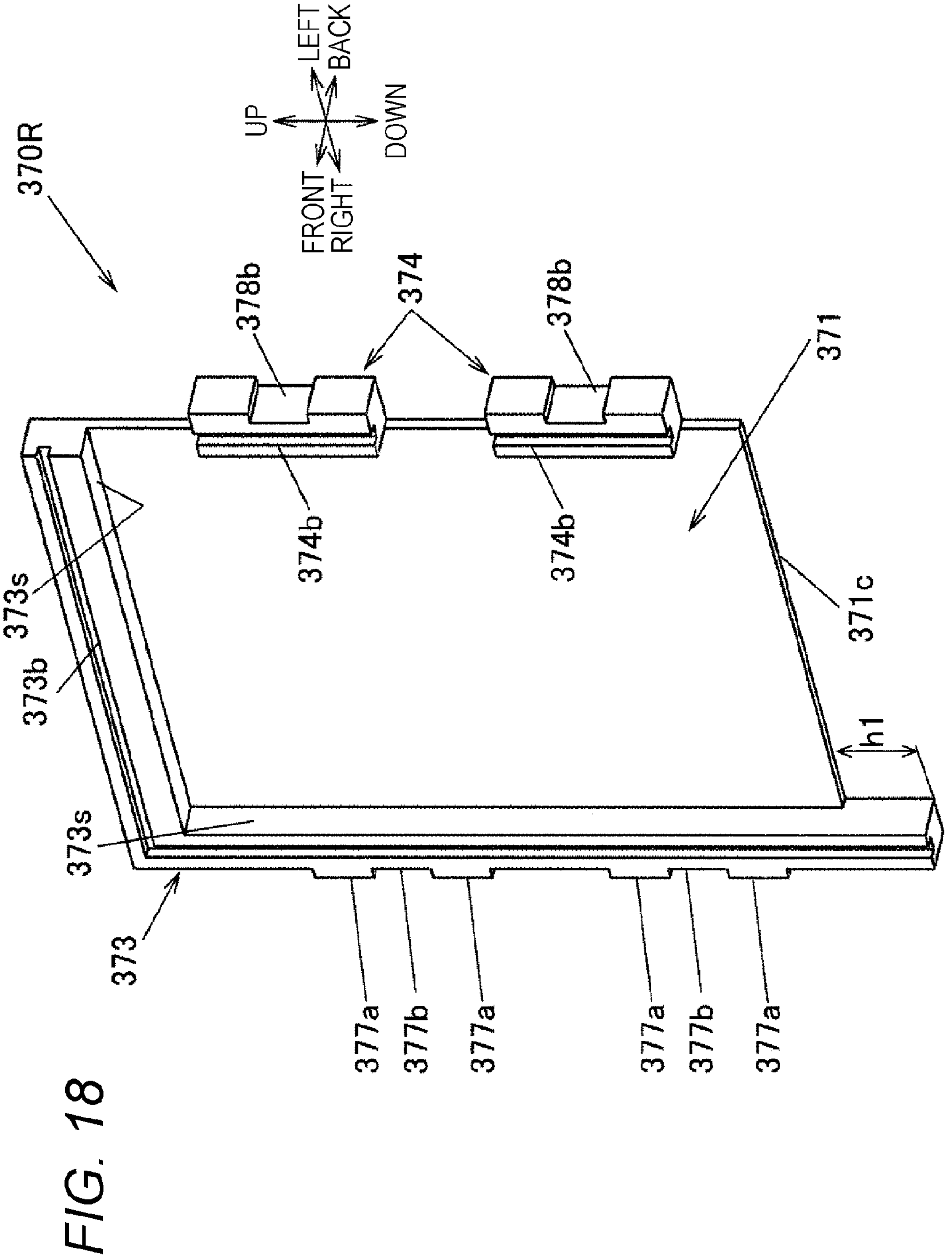
FIG. 18 is a perspective view of a back-side end holder of the element stacked body.
Figure 19:
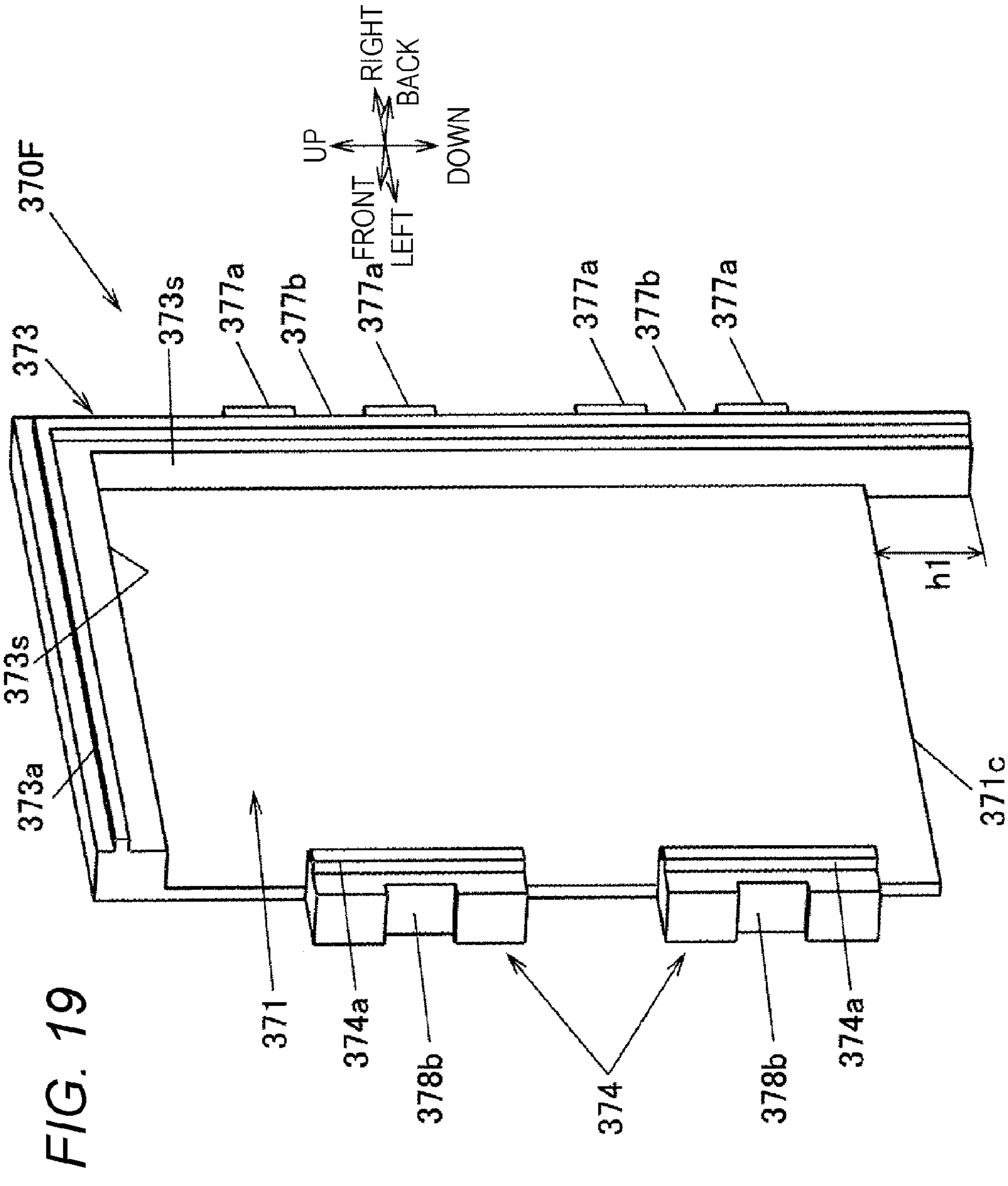
FIG. 19 is a perspective view of a front-side end holder of the element stacked body.

FIG. 16 is similar to FIG. 3, which is an exploded perspective view illustrating a configuration of the element stacked body 31. FIG. 17 is a perspective view of an intermediate holder 360. FIGS. 18 and 19 are perspective views of a back-side end holder 370R and a front-side end holder 370F of the element stacked body 31.

As illustrated in FIG. 16, each of intermediate holders 360 has a wide surface abutment part 361, a first connection part 363 provided along the upper and right ends of the wide surface abutment part 361, and a pair of second connection parts 364 provided along the left end of the wide surface abutment part 361.

The wide surface abutment part 361 is a rectangular flat plate that is arranged between the adjacent cell batteries 101 as illustrated in FIG. 16. As illustrated in FIG. 17, the front surface of the wide surface abutment part 361 is in abutment with the back-side wide side plate 109*w* of the cell battery 101 at the front side of the intermediate holder 360. The back surface of the wide surface abutment part 361 is in abutment with the front-side wide side plate 109*w* of the cell battery 101 at the back side of the intermediate holder 360.

The wide surface abutment part 361 has a rectangular cutout 361*c* at the lower portion. In other words, the lower end of the first connection part 363 protrudes more downward than the wide surface abutment part 361. In this embodiment, the lower end surface of the first connection part 363 is positioned more downward by the distance h1 than the lower end surface of the wide surface abutment part 361. As illustrated in FIG. 16, the cell battery 101 is arranged such that the outer surface of the narrow sideplate 109*n* arranged at the lower side and the lower end surface of the first connection part 363 are flush with each other. That is, the outer surface of the lower-side narrow side plate 109*n* of the cell battery 101 is positioned more downward by the distance h1 than the lower end surface of the wide surface abutment part 361.

The first connection part 363 is approximately L-shaped as seen from the front-back direction. The first connection part 363 has a fitting concave 363*b* ranging from one to the other ends of the front surface, and has a fitting convex 363*a* ranging from one to the other ends of the back surface.

The second connection parts 364 in a pair are the same in shape and are approximately rectangular parallelepipeds. Each of the second connection parts 364 has a fitting concave 364*b* extended in the up-down direction on the front surface, and a fitting convex 364*a* extended in the up-down direction on the back surface.

The fitting convex 363*a* is fitted to the fitting concave 363*b* of the adjacent intermediate holder 360 or a fitting concave 373*b* of an adjacent end holder 370R described later. The fitting concave 363*b* is fitted to the fitting convex 363*a* of the adjacent intermediate holder 360 or a fitting convex 373*a* of the adjacent end holder 370F described later.

The first connection part 363 has an inner surface 363*s* divided into two by the wide surface abutment part 361 in the front-back direction. The front-side inner surface 363*s* is in abutment with one of the narrow side plates 109*n* in a pair and the bottom plate 109*b* of the cell battery 101 at the front side of the intermediate holder 360. The back-side inner surface 363*s* is in abutment with one of the narrow side plates 109*n* in a pair and the bottom plate 109*b* of the cell battery 101 at the back side of the intermediate holder 360.

As illustrated in FIG. 16, each of the second connection parts 364 also has an inner surface 364*s* divided into two by the wide surface abutment part 361 in the front-back direction. The front-side inner surface 364*s* is in abutment with the battery cover 108 of the cell battery 101 at the front side of the intermediate holder 360. The back-side inner surface 364*s* is in abutment with the battery cover 108 of the cell battery 101 at the back side of the intermediate holder 360.

As illustrated in FIG. 17, the first connection part 363 has four convexes 367*a* protruding rightward on the outer surface. A fitting concave 367*b* is formed between the first and second convexes 367*a* from the top to fit with the side surface abutment part 141*a* of the side frame 140. Similarly, a fitting concave 367*b* is formed between the third and fourth convexes 367*a* from the top to fit with the side surface abutment part 141*a* of the side frame 140.

The second connection parts 364 in a pair are arranged at a predetermined space. The gas exhaust valve 108*b* of the battery cover 108 is arranged between the second connection parts 364 in a pair. Each of the second connection parts 364 has a fitting concave 368*b* to which the side surface abutment part 141*a* of the side frame 140 is fitted.

As illustrated in FIGS. 18 and 19, the back-side end holder 370R arranged at the back end of the element stacked body 31 and the front-side end holder 370F arranged at the front end of the element stacked body 31 are approximately plane-symmetrical with respect to the plane orthogonal to the front-back direction. Accordingly, the back-side end holder 370R will be described as a representative with reference to FIGS. 16 and 18. As for the front-side end holder 370F, only the parts different from the back-side end holder 370R will be described.

As illustrated in FIG. 18, the back-side end holder 370R has a wide surface abutment part 371, a first connection part 373 provided along the upper and right ends of the wide surface abutment part 371, and a pair of second connection parts 374 provided along the left end of the wide surface abutment part 371.

The wide surface abutment part 371 is a rectangular flat plate that is arranged between the cell battery 101 and the end plate 120 as illustrated in FIG. 16. As illustrated in FIGS. 16 and 18, the front surface of the wide surface abutment part 371 is in abutment with the back-side wide side plate 109*w* of the cell battery 101 at the front side of the back-side end holder 370R. The back surface of the wide surface abutment part 371 is in abutment with the end plate 120.

The wide surface abutment part 371 has a rectangular cutout 371*c* at the lower portion. In other words, the lower end of the first connection parts 373 protrudes more downward than the wide surface abutment part 371. In this embodiment, the lower end surface of the first connection part 373 is positioned more downward by the distance h1 than the lower end surface of the wide surface abutment part 371. The cell battery 101 is arranged such that the outer surface of the narrow side plate 109*n* arranged at the lower side and the lower end surface of the first connection part 373 are flush with each other. That is, the outer surface of the lower-side narrow side plate 109*n* of the cell battery 101 is positioned more downward by the distance h1 than the lower end surface of the wide surface abutment part 371.

The first connection part 373 is approximately L-shaped as seen from the front side. The first connection part 373 has a fitting concave 373*b* ranging from one to the other ends of the front surface. The fitting concave 373*b* is fitted in the convex 363*a* of the adjacent intermediate holder 360.

The second connection parts 374 in a pair are the same in shape and are approximately rectangular parallelepipeds. Each of the second connection parts 374 has a fitting concave 374*b* extended in the up-down direction on the front surface. The fitting concave 374*b* is fitted to the fitting convex 364*a* of the adjacent intermediate holder 360.

The first connection part 373 is provided to protrude forward from the wide surface abutment part 361. The inner surface 373*s* of the first connection part 373 is in abutment with one of the narrow side plates 109*n* in a pair and the bottom plate 109*b* of the cell battery 101 at the front side of the intermediate holder 360.

As illustrated in FIG. 16, the second connection parts 374 are also provided to protrude forward from the wide surface abutment part 371. The inner surfaces 364*s* of the second connection parts 374 are in abutment with the battery cover 108 of the cell battery 101 at the front side of the intermediate holder 360.

As illustrated in FIG. 18, the first connection part 373 has four convexes 377*a* protruding rightward on the outer surface. A fitting concave 377*b* is formed between the first and second convexes 377*a* from the top to fit with the side surface abutment part 141*a* of the side frame 140. Similarly, a fitting concave 377*b* is formed between the third and fourth convexes 377*a* from the top to fit with the side surface abutment part 141*a* of the side frame 140.

The second connection parts 364 in a pair are arranged at a predetermined space. The gas exhaust valve 108*b* of the battery cover 108 is arranged between the second connection parts 374 in a pair. Each of the second connection parts 374 has a fitting concave 378*b* to which the side surface abutment part 141*a* of the side frame 140 is fitted.

As illustrated in FIG. 19, the front-side end holder 370F and the back-side end holder 370R illustrated in FIG. 18 are approximately symmetric with respect to the plane orthogonal to the front-back direction. The two are different from each other in that, whereas the back-side end holder 370R has the fitting concaves 373*b* and 374*b* on the front surfaces of the first connection part 373 and the second connection parts 374, the front-side end holder 370F has the fitting convexes 373*a* and 374*a* on the back surfaces of the first connection part 373 and the second connection parts 374.

The element stacked body 31 is integrated by connecting the first connection parts 363 and 373 and the second connection parts 364 and 374. The side surface abutment parts 141*a* of the left side frame 140 are fitted to the fitting concaves 368*b* and 378*b* of the element stacked body 31 (see FIG. 14). The side surface abutment parts 141*a* of the right side frame 140 are fitted to the fitting concaves 367*b* and 377*b* of the element stacked body 31 (see FIG. 14).

The second connection parts 374 of the front-side end holder 370F are fitted to the front-side engagement part 141*b* of the left side frame 140, and the second connection parts 374 of the back-side end holder 370R are fitted to the back-side engagement part 141*b* of the left side frame 140. Although not illustrated, the convexes 377*a* of the first connection part 373 of the front-side end holder 370F engage with the front-side engagement part 141*b* of the right side frame 140, and the convexes 377*a* of the first connection part 373 of the back-side end holder 370R engage with the back-side engagement part 141*b* of the left side frame 140.

The bend parts 142 of the side frames 140 are screwed into the end plates 120 by the screws 150. The element stacked body 31 is sandwiched and compressed by a predetermined amount between the pair of end plates 120 in the direction of stacking. The duct unit 110 has the guide part attachment pieces 111*a* screwed by the screws 152 into the end plates 120 and the leg part attachment pieces 112*a* screwed by the screws 151 into the heat transfer plate 191. When the duct unit 110 is screwed and tightened by the screws, the element stacked body 31 is pressed downward and the narrow side plates 109*n* of the cell battery 101 constituting the lower surface of the element stacked body 31 are closely attached to the thermally-conductive sheet 180. The wide surface abutment parts 361 and 371 of the battery holders 360, 370F, and 370R are provided with the cutouts 361*c* and 371*c*. This prevents the wide surface abutment parts 361 and 371 from contacting the thermally-conductive sheet 180 when the electricity storage block 300 and the cooling structure 190 are thermally connected.

According to the third embodiment as described above, it is possible to produce the same advantages as those in the first embodiment.

The following modification examples fall within the scope of the present invention and one or more of the modification examples may be combined with the foregoing embodiments.

Figure 20:
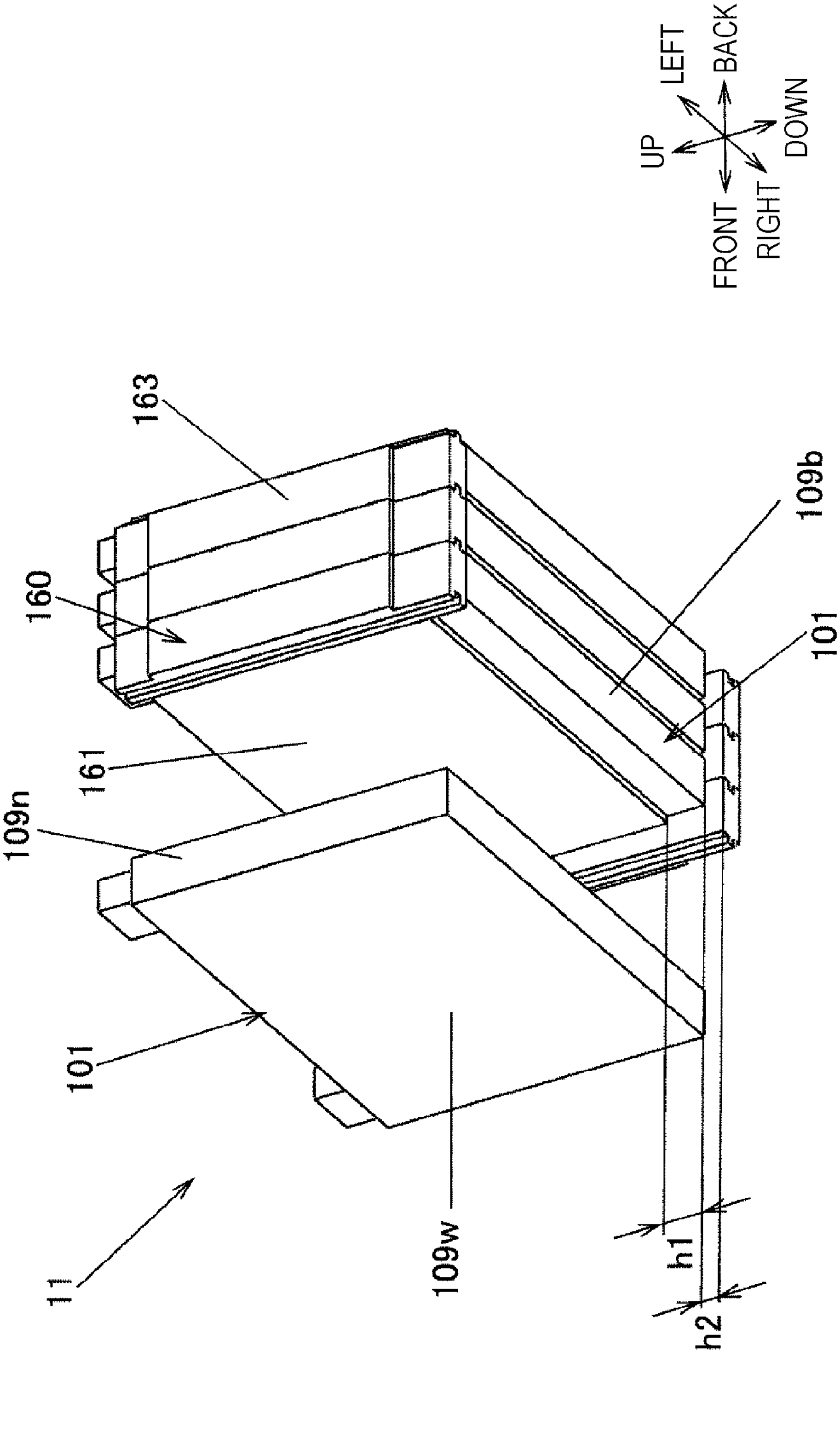
FIG. 20 is a perspective view illustrating a configuration of an element stacked body of an electricity storage module according to a modification example of the first embodiment.

(1) In the first embodiment, the lower end surfaces of the connection parts 163 of the intermediate holders 160 and the outer surfaces of the bottom plates 109*b* of the cell batteries 101 are flush with each other (see FIG. 3). However, the present invention is not limited to this configuration. As illustrated in FIG. 20, the lower portions of the connection parts 163 of the intermediate holders 160 may protrude toward the heat transfer plate 191 more than the bottom plates 109*b* of the cell batteries 101. In this modification example, the lower end surfaces of the connection parts 163 are positioned more downward by a distance h2 than the outer surfaces of the bottom plates 109*b* of the cell batteries 101. Although not illustrated, in this modification example, the lower end surfaces of the connection parts 173 of the end holders 170 and the lower end surfaces of the end plates 120 are also positioned more downward by the distance h2 than the outer surfaces of the bottom plates 109*b* of the cell batteries 101. The intermediate holder 160 will be described as a representative.

Figure 21:
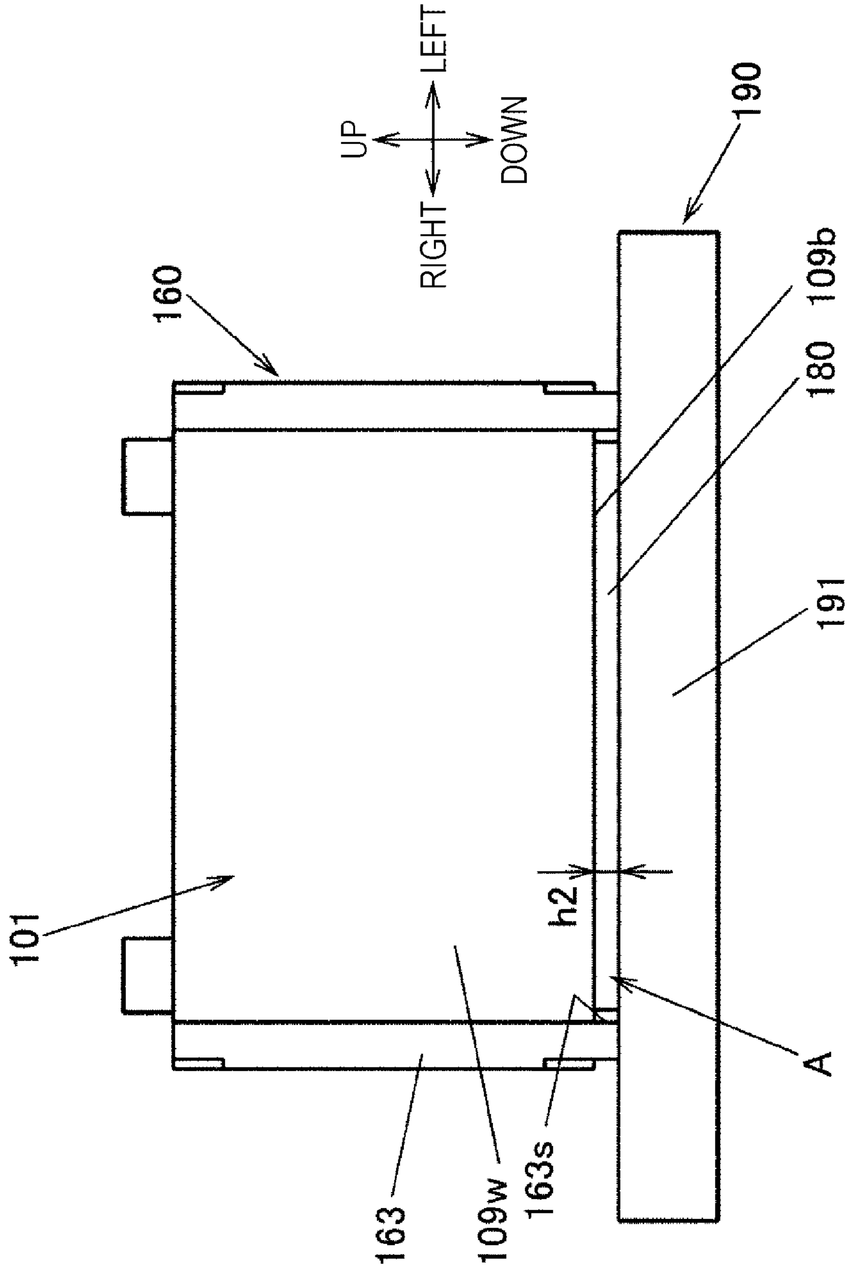
FIG. 21 is a front view of an intermediate holder and a cell battery illustrated in FIG. 20.

FIG. 21 is a bottom view of the intermediate holder 160 and the cell battery 101 illustrated in FIG. 20. As illustrated in FIG. 21, in this modification example, the lower end surfaces of the connection parts 163 are positioned more downward than the outer surface of the bottom plate 109*b*. In other words, the lower ends of the connection parts 163 are set as plate abutment parts protruding toward the heat transfer plate 191 more than the heat transfer surface of the cell battery 101. In this modification example, the lower end surfaces of the connection parts 163 abut directly with the surface of the heat transfer plate 191 when the electricity storage block 100 is thermally connected to the cooling structure 190 and the thermally-conductive sheet 180 is compressed by a predetermined amount.

When the lower end surfaces of the connection parts 163 abut with the heat transfer plate 191, a space A is formed and surrounded by the inner surfaces 163*s* of the connection parts 163 and the inner surfaces 173*s* of the connection parts 173, the outer surface of the bottom plate 109*b* of the cell battery 101, the heat transfer plate 191, and the pair of end plates 120.

The thermally-conductive sheet 180 is arranged in the space A.

The distance h2 between the lower end surfaces of the connection parts 163 and the outer surface of the bottom plate 109*b* of the cell battery 101 is set taking into account the compression ratio of the thermally-conductive sheet 180. When the thickness of the thermally-conductive sheet 180 before the compression is designated as ts1, the relationship $0<h2<ts1$ needs to be satisfied to compress the thermally-conductive sheet 180. In this modification example, the thermally-conductive sheet 180 is compressed until the lower end surfaces of the connection parts 163 abut with the heat transfer plate 191. Accordingly, a thickness ts2 of the thermally-conductive sheet 180 after the compression becomes equal to h2. The thermally-conductive sheet 180 is compressed at a compression ratio of $(ts1-ts2)\times100/ts1$ (%).

When being compressed in the up-down direction (thickness direction), the thermally-conductive sheet 180 is deformed and extended in the front-back and right-left directions. Accordingly, the thermally-conductive sheet 180 is made slightly smaller in dimensions than the dimensions of the space A in the front-back and right-left directions, so that the dimensions of the thermally-conductive sheet 180 after the compression in the front-back and right-left directions fall within the space A.

According to the foregoing modification example, in addition to the foregoing advantages in the first embodiment, the following advantages can be produced. The thickness ts2 of the thermally-conductive sheet 180 after the compression can be equal to the distance h2. It is necessary to control the compression ratio such that the thermally-conductive sheet 180 causes no permanent strain. According to this modification example, however, the thickness ts2 of the thermally-conductive sheet 180 after the compression is determined by the protrusion length h2 of the connection parts 163 and 173 and the end plates 120, which facilitates the control of the compression ratio. Further, since the battery holders 160 and 170 and the end plates 120 are in abutment with the heat transfer plate 191, vibration and impact acting on the electricity storage module 10 are more stable than those in the first embodiment.

Figure 22:
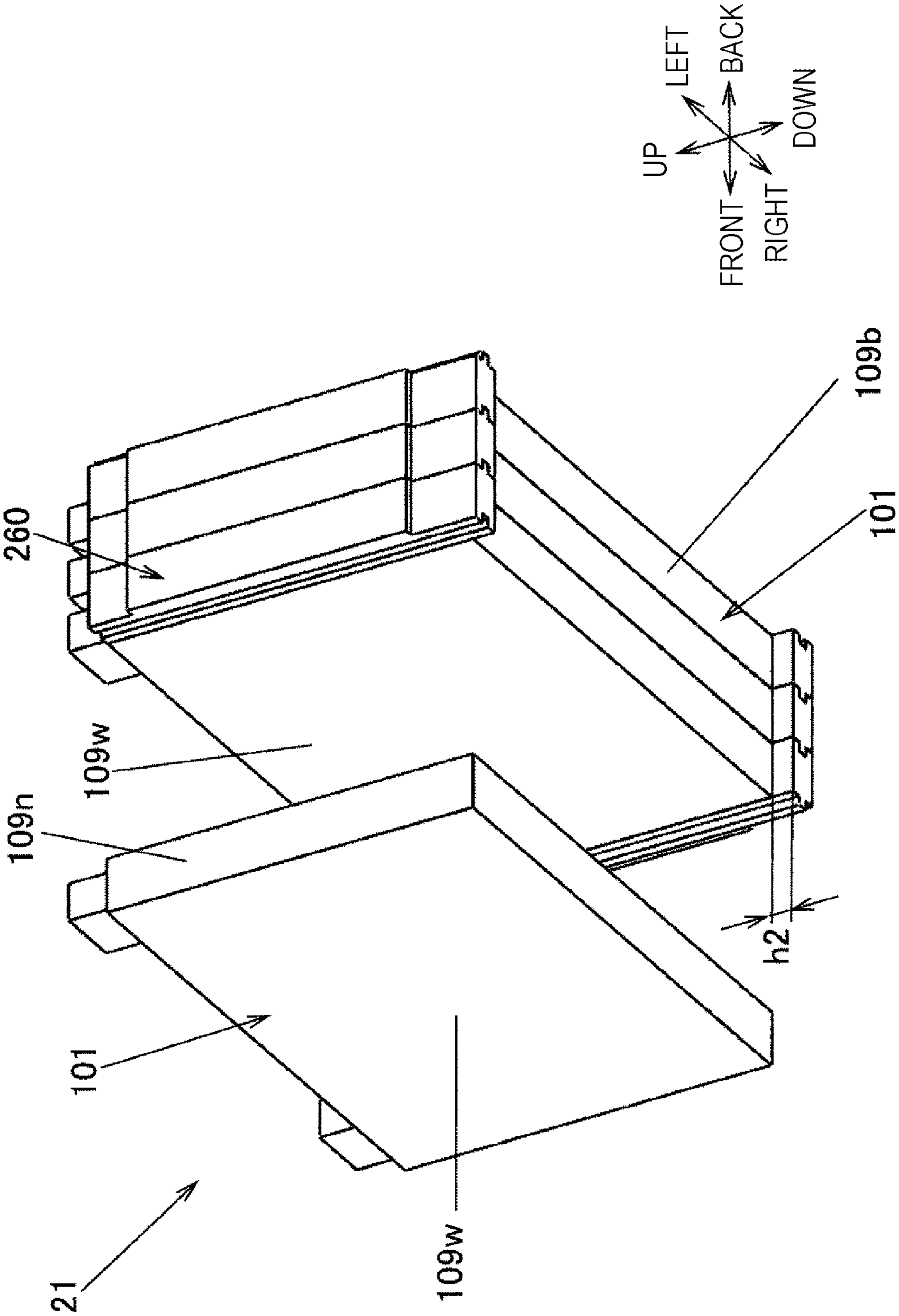
FIG. 22 is a perspective view illustrating a configuration of an element stacked body of an electricity storage module according to a modification example of the second embodiment.

Similarly, as illustrated in FIG. 22, in the second embodiment, the lower end surfaces of the intermediate holders 260 may be positioned more downward than the outer surfaces of the bottom plates 109*b* of the cell batteries 101 in order to allow the lower end surfaces of the intermediate holders 260 to abut with the heat transfer plate 191. In addition, although not illustrated, in the second embodiment, the lower end surfaces of the connection parts 273 of the end holders 270 may be positioned more downward than the outer surfaces of the bottom plates 109*b* of the cell batteries 101 in order to allow the lower end surfaces of the connection parts 273 of the end holders 270 abut with the heat transfer plate 191.

Figure 23:
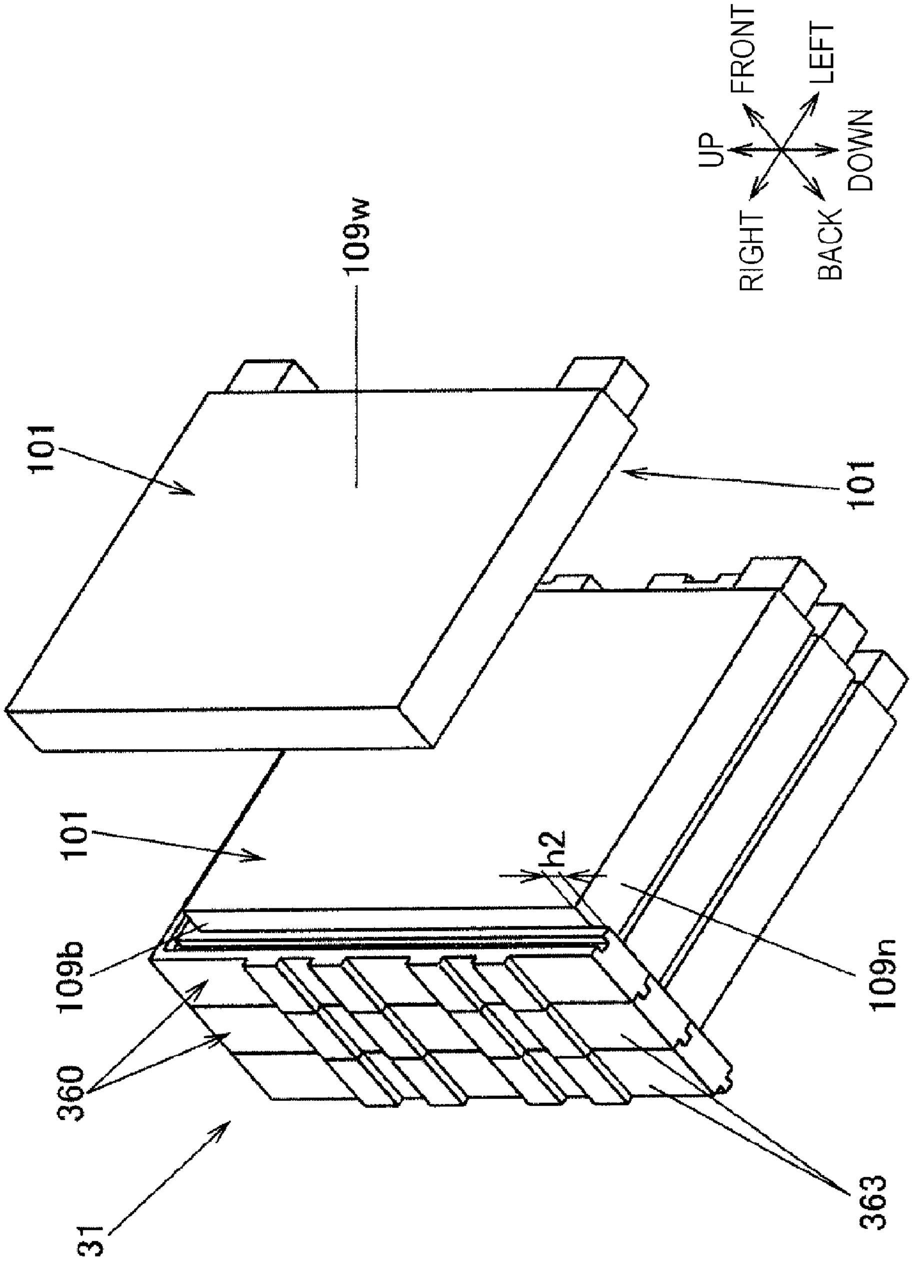

Similarly, as illustrated in FIG. 23, in the third embodiment, the lower end surfaces of the first connection parts 363 of the intermediate holders 360 may be positioned more downward than the outer surfaces of the narrow side plates 109*n* of the cell batteries 101. In addition, although not illustrated, in the third embodiment, the lower surfaces of the first connection parts 373 of the end holders 370F and 370R may be positioned more downward than the outer surfaces of the narrow side plates 109*n* of the cell batteries 101 in order to allow the lower end surfaces of the first connection parts 373 of the end holders 370F and 370R to abut with the heat transfer plate 191.

Figure 24:
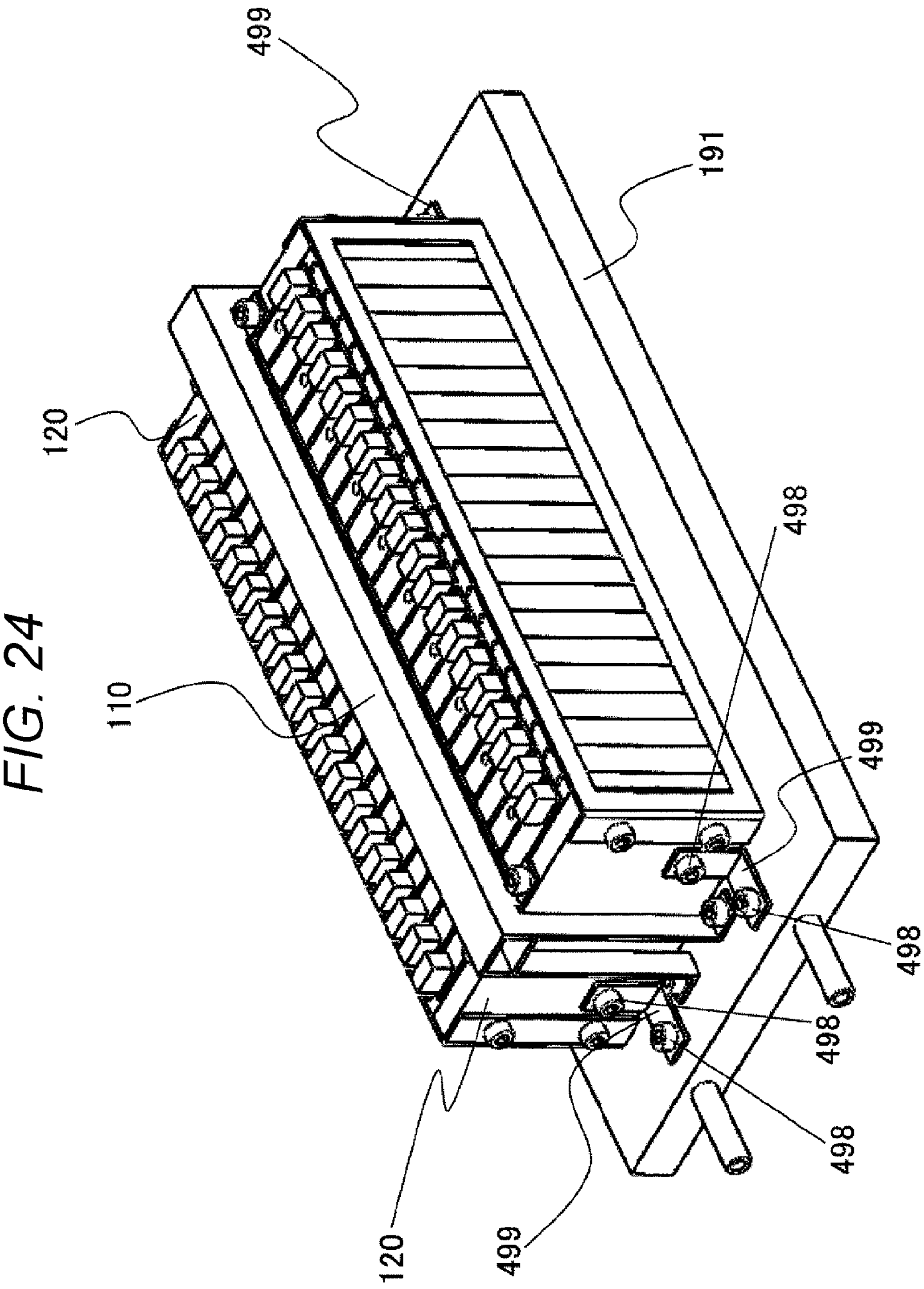
FIG. 24 is a perspective outer view of the electricity storage module with end plates fixed to a heat transfer plate by L-shaped brackets.

(2) The method for connecting the duct unit 110 and the heat transfer plate 191 is not limited to the foregoing one. For example, as illustrated in FIG. 24, in the first embodiment, the end plates 120 may be fixed to the heat transfer plate 191 by use of L-shaped brackets 499 and screws 498. In the electricity storage module illustrated in FIG. 24, the two each L-shaped brackets 499 are attached to the pair of end plates 120.

Figure 25:
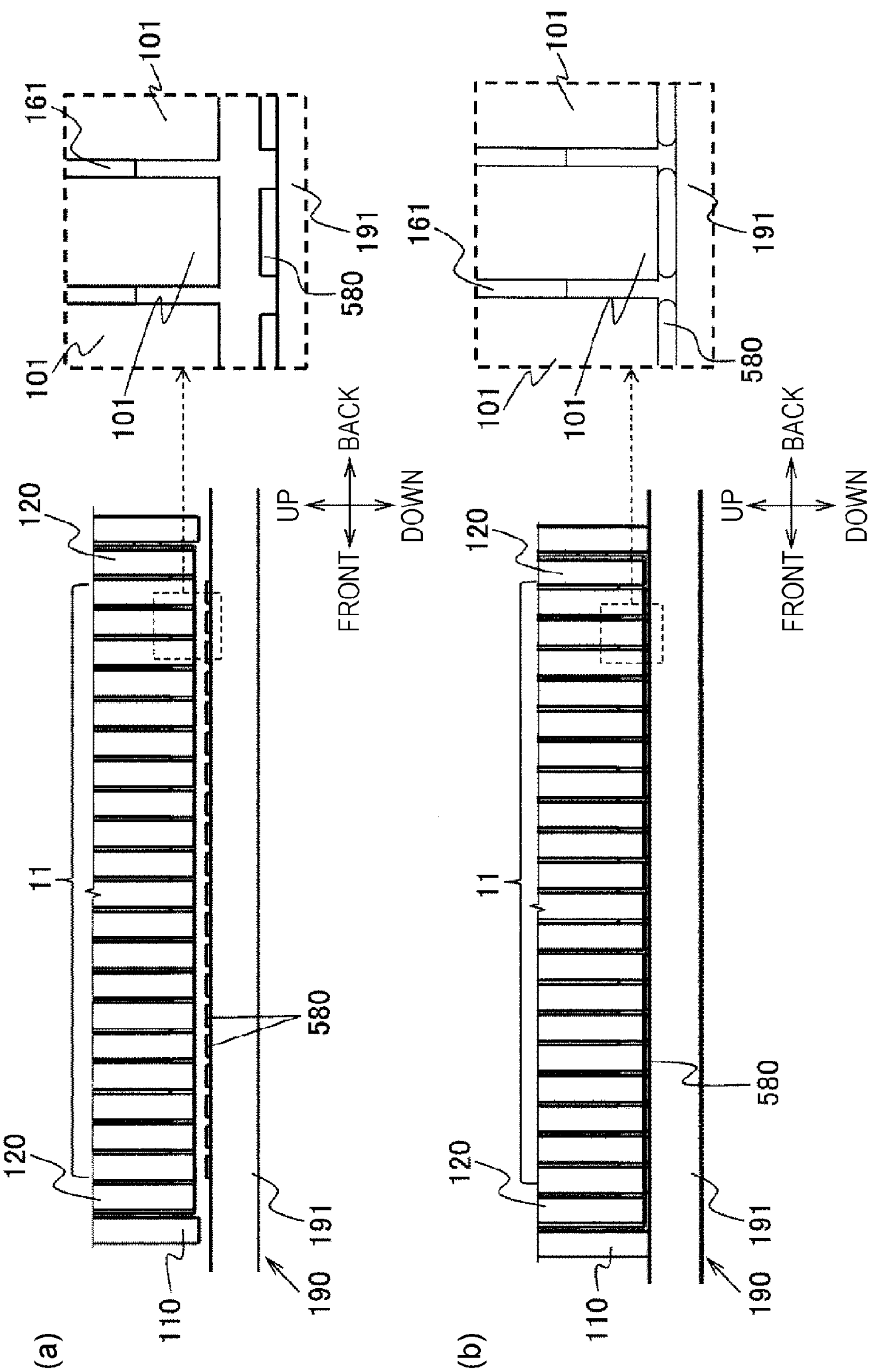
FIG. 25 includes diagrams describing an example in which a thermally-conductive sheet is arranged for each cell battery.

(3) In the foregoing embodiments, one thermally-conductive sheet 180 is arranged on the heat transfer plate 191. However, the present invention is not limited to this configuration. For example, instead of the thermally-conductive sheet 180 in the first embodiment, a strip-like thermally-conductive sheet 580 may be arranged in correspondence with the bottom plate 109*b* of each cell battery 101, as illustrated in FIG. 25. According to this modification example, the wide surface abutment parts 161 of the intermediate holders 160 and the wide surface abutment parts 171 of the end holders 170 do not contact the thermally-conductive sheets 580, and only the bottom plates 109*b* of the cell batteries 101 are closely attached to the thermally-conductive sheets 580, thereby reducing the compression reaction force.

(4) In the foregoing embodiments, the thermally-conductive sheet 180 has favorable heat conductivity and favorable electric insulating properties. However, the present invention is not limited to this configuration. A thermally-conductive sheet with favorable heat conductivity and an insulating sheet with favorable electric insulating properties may be stacked.

(5) The element stacked bodies 11, 21, and 31 are composed of a plurality of cell batteries 101 and battery holders 160, 170, 260, 270, 360, 370F, and 370R. However, the present invention is not limited to this configuration. For example, in the first embodiment, spacers may be arranged between the end holders 170 and the cell batteries 101 or between the end holders 170 and the end plates 120 in order to adjust the dimensions of the element stacked body 11 in the longitudinal direction (direction of stacking). Similarly, in the second and third embodiments, such spacers may be arranged. The end plates 120 or the battery containers of the cell batteries 101 may be provided with insulating properties to eliminate the end holders 170, 270, 370F, and 370R.

(6) In the foregoing embodiments, only single side surfaces of the cell batteries 101 are the heat transfer surfaces of the cell batteries 101 to be closely attached to the thermally-conductive sheet 180 of the element stacked bodies 11, 21, and 31. However, the present invention is not limited to this configuration. The heat transfer surfaces of the cell batteries 101 may protrude more downward than the lower end surfaces of the wide surface abutment parts 161, 171, 271, 361, and 371. For example, in the first embodiment, when the cell batteries 101 are compressed against the thermally-conductive sheet 180, the lower end surfaces of the wide surface abutment parts 161 may contact a part of the thermally-conductive sheet 180 elastically deformed and escaped between the cell batteries 101. This reduces the compression reaction force as compared to the case where the lower end surfaces of the wide surface abutment parts 161 and 171 and the outer surface of the bottom plates 109*b* of the cell batteries 101 are flush with each other.

(7) The thermally-conductive sheet 180 may be used in combination with an insulating thermally-conductive gel such as silicon oil. The use of the thermally-conductive gel allows the heat transfer surfaces of the element stacked bodies 11, 21, and 31 and the surface of the heat transfer plate 191 to be closely attached to the thermally-conductive sheet 180. Further, in the case of using the thermally-conductive sheet 180 and the thermally-conductive gel in combination, the thermally-conductive gel plays the role of absorbing variations in the dimensions of the battery containers of the cell batteries 101. This reduces the amount of compression of the thermally-conductive sheet 180 as compared to the case of using the thermally-conductive sheet 180 alone.

(8) In the foregoing embodiments, the cooling pipe 192 is arranged on the heat transfer plate 191. However, the present invention is not limited to this configuration. Instead of the cooling pipe 192, a heating pipe may be arranged on the heat transfer plate 191 to circulate a heating medium for heating the heat transfer plate 191. Providing the heating pipe could heat in advance the electricity storage module for use in cold climate regions or in winter season to temperatures at which the electricity storage module can offer sufficient performance. Further, including the heating pipe and the cooling pipe 192 would allow temperature adjustment within the temperature range suited to the cell batteries 101.

(9) In the foregoing embodiments, the electricity storage module 10 is incorporated into an electricity storage device installed in a hybrid electric automobile or a purely electric automobile. However, the present invention is not limited to this configuration. The present invention may also be applied to electricity storage modules usable for electricity storage devices in other electric vehicles (moving vehicles), for example, railway vehicles such as hybrid trains, shared vehicles such as buses, cargo vehicles such as motor trucks, industrial vehicles such as turret vehicles and battery-powered forklift trucks, construction machines such as cranes and loading shovels, driverless moving vehicles, and golf carts. The present invention may also be applied to electricity storage modules incorporated into stationary electricity storage devices. The present invention may also be applied as a power source for medical instruments, power storage systems, and elevators. Regardless of domestic use, business use, or industrial use, the present invention can be used as an electricity storage system that charges electricity storage elements by solar power or wind power for electricity storage. The present invention can also be used as an electricity storage system that charges electricity storage elements by night-time power. The present invention can also be used as an electricity storage system usable at places beyond the earth such as space stations, space ships, or space ports.

(10) In the foregoing description, the lithium-ion secondary batteries are taken as an example of electricity storage elements. However, the present invention is also applicable to other secondary batteries such as nickel-hydrogen batteries. In addition, the present invention can also be applied to electricity storage modules having electric double-layer capacitors and lithium-ion capacitors as electricity storage elements.

The present invention is not limited to the foregoing embodiments, provided that the features of the present invention are not lost. Other conceivable embodiments within the scope of technical ideas of the present invention are also included in the scope of the present invention.

REFERENCE SIGNS LIST

10 electricity storage module
11 element stacked body
21 element stacked body
30 electricity storage module
31 element stacked body
100 electricity storage block
101 cell battery
102 battery cover
104 positive terminal
105 negative terminal
108 battery cover
**108*a*** liquid injection stopper
**108*b*** gas exhaust valve
109 battery can
**109*a*** opening
**109*b*** bottom plate
**109*n*** narrow side plate
**109*w*** wide side plate
110 duct unit
111 gas guide part
**111*a*** guide part attachment piece
112 leg part
**112*a*** leg part attachment piece
115 seal member
**115*a*** opening
120 end plate
140 side frame
141 side plate
**141*a*** side plate attachment part
**141*b*** engagement part
142 bend part
143 opening
160 intermediate holder
161 wide surface abutment part
**161*c*** cutout
163 connection part
**163*a*** fitting convex
**163*b*** fitting concave
**163*s*** inner surface
**167*a*** convex
**167*b*** abutment surface part
168 convex
170 end holder
171 wide surface abutment part
**171*c*** cutout
173 connection part
**173*a*** fitting convex
**173*b*** fitting concave
**173*s*** inner surface
**177*a*** convex
**177*b*** abutment surface part
180 thermally-conductive sheet
190 cooling structure
191 heat transfer plate
192 cooling pipe
200 electricity storage block
260 intermediate holder
270 end holder
271 wide surface abutment part
**271*c*** cutout
273 connection part
**273*a*** fitting convex
**273*b*** fitting concave
**277*a*** convex
**277*b*** abutment surface part
300 electricity storage block
360 intermediate holder
361 wide surface abutment part
**361*c*** cutout
363 first connection part
**363*a*** fitting convex
**363*b*** fitting concave

363*s* inner surface
364 second connection part
364*a* fitting convex
364*b* fitting concave
364*s* inner surface
367*a* convex
367*b* fitting convex
368*b* fitting concave
370F front-side end holder
370R back-side end holder
371 wide surface abutment part
371*c* cutout
373 first connection part
373*a* fitting convex
373*b* fitting concave
373*s* inner surface
374 second connection part
374*b* fitting concave
377*a* convex
377*b* fitting concave
378*b* fitting concave
498 screw
499 L-shaped bracket
580 thermally-conductive sheet

The invention claimed is:

1. An electricity storage block thermally connected to a heat transfer plate via an elastic thermally-conductive sheet, comprising:

an element stacked body in which a plurality of square electricity storage elements having a pair of first narrow surfaces, a pair of second narrow surfaces, and a pair of wide surfaces is stacked and arranged such that the wide surfaces of the adjacent square electricity storage elements are opposed to each other; and a pressing device that presses the element stacked body toward the thermally-conductive sheet arranged on the heat transfer plate, wherein the element stacked body includes a holder having a surface abutment part in abutment with one of the wide surfaces in a pair in at least a predetermined square electricity storage element, one of the first narrow surfaces in a pair in the square electricity storage element is set as a heat transfer surface thermally connected to the heat transfer plate via the thermally-conductive sheet, and the heat-transfer surface of the square electricity storage element protrudes toward the heat transfer plate more than an end surface of a wide surface abutment part.

2. The electricity storage block according to claim 1, wherein the holder has a plate abutment part protruding toward the heat transfer plate more than the heat transfer surface of the square electricity storage element such that the holder abuts directly with the heat transfer plate when the electricity storage block is thermally connected to the heat transfer plate.

3. The electricity storage block according to claim 1, wherein the holder is an intermediate holder with the surface abutment part arranged between an adjacent square electricity storage elements.

4. The electricity storage block according to claim 1, comprising a pair of end plates sandwiching the element stacked body in a direction of stacking, wherein the holder is an end holder with the surface abutment part arranged between the square electricity storage element and the end plate at the both ends of the element stacked body in the direction of stacking.

5. The electricity storage block according to claim 1, wherein the square electricity storage element has a positive terminal and a negative terminal on a first narrow surface opposed to the heat transfer surface.

6. The electricity storage block according to claim 1, wherein the square electricity storage element has a positive terminal and a negative terminal on one of the second narrow surfaces in a pair.

7. An electricity storage module, comprising:

the electricity storage block according to claim 1;

a heat transfer plate thermally connected to the electricity storage block; and a thermally-conductive sheet that is arranged on the heat transfer plate and is sandwiched between the electricity storage block and the heat transfer plate, wherein an end surface of the surface abutment part at the heat transfer plate side is opposed to the thermally-conductive sheet.

* * * * *